(12) United States Patent
Khartikov et al.

(10) Patent No.: US 10,338,927 B2
(45) Date of Patent: Jul. 2, 2019

(54) METHOD AND APPARATUS FOR IMPLEMENTING A DYNAMIC OUT-OF-ORDER PROCESSOR PIPELINE

(71) Applicant: Intel Corporation, Santa Clara, CA (US)

(72) Inventors: Denis M. Khartikov, San Jose, CA (US); Naveen Neelakantam, Mountain View, CA (US); John H. Kelm, Sunnyvale, CA (US); Polychronis Xekalakis, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 257 days.

(21) Appl. No.: 15/477,374

(22) Filed: Apr. 3, 2017

(65) Prior Publication Data
US 2017/0300334 A1    Oct. 19, 2017

Related U.S. Application Data

(63) Continuation of application No. 14/228,690, filed on Mar. 28, 2014, now Pat. No. 9,612,840.

(51) Int. Cl.
*G06F 15/76* (2006.01)
*G06F 15/00* (2006.01)
(Continued)

(52) U.S. Cl.
CPC ........ *G06F 9/3802* (2013.01); *G06F 9/30145* (2013.01); *G06F 9/3836* (2013.01);
(Continued)

(58) Field of Classification Search
None
See application file for complete search history.

(56) References Cited

U.S. PATENT DOCUMENTS

| 5,630,157 A | 5/1997 | Dwyer, III |
| 5,983,336 A | 11/1999 | Sakhin et al. |

(Continued)

FOREIGN PATENT DOCUMENTS

| CN | 102144225 A | 8/2011 |
| EP | 1 152 329 A1 | 11/2011 |

(Continued)

OTHER PUBLICATIONS

Combined Search and Examination Report for Application No. GB1500942.6, dated Jul. 22, 2015, 10 pages.
(Continued)

*Primary Examiner* — Michael Sun
(74) *Attorney, Agent, or Firm* — Nicholson De Vos Webster & Elliott LLP

(57) ABSTRACT

A hardware/software co-design for an optimized dynamic out-of-order Very Long Instruction Word (VLIW) pipeline. For example, one embodiment of an apparatus comprises: an instruction fetch unit to fetch Very Long Instruction Words (VLIWs) in their program order from memory, each of the VLIWs comprising a plurality of reduced instruction set computing (RISC) instruction syllables grouped into the VLIWs in an order which removes data-flow dependencies and false output dependencies between the syllables; a decode unit to decode the VLIWs in their program order and output the syllables of each decoded VLIW in parallel; and an out-of-order execution engine to execute the syllables preferably in parallel with other syllables, wherein at least some of the syllables are to be executed in a different order than the order in which they are received from the decode unit, the out-of-order execution engine having one or more processing stages which do not check for data-flow dependencies and false output dependencies between the syllables when performing operations.

27 Claims, 17 Drawing Sheets

(51) Int. Cl.
*G06F 9/38* (2018.01)
*G06F 9/30* (2018.01)
*G06F 9/46* (2006.01)

(52) U.S. Cl.
CPC .......... *G06F 9/3853* (2013.01); *G06F 9/3855* (2013.01); *G06F 9/3891* (2013.01); *G06F 9/46* (2013.01)

(56) References Cited

U.S. PATENT DOCUMENTS

| | | | |
|---|---|---|---|
| 6,081,884 A * | 6/2000 | Miller | G06F 9/30152 |
| | | | 712/204 |
| 6,253,309 B1 | 6/2001 | Mahalingaiah | |
| 6,289,433 B1 * | 9/2001 | Garg | G06F 9/3013 |
| | | | 712/216 |
| 6,484,255 B1 * | 11/2002 | Dulong | G06F 9/30018 |
| | | | 710/30 |
| 6,539,471 B2 | 3/2003 | Sheaffer | |
| 6,658,551 B1 | 12/2003 | Berenbaum et al. | |
| 6,738,893 B1 | 5/2004 | Rozas | |
| 6,950,926 B1 | 9/2005 | Menezes | |
| 2002/0035677 A1 | 3/2002 | Sheaffer | |
| 2002/0124012 A1 | 9/2002 | Liem et al. | |
| 2002/0178360 A1 | 11/2002 | Wenocur et al. | |
| 2004/0268098 A1 * | 12/2004 | Almog | G06F 9/3808 |
| | | | 712/227 |
| 2006/0004996 A1 | 1/2006 | Gonion | |
| 2006/0095750 A1 * | 5/2006 | Nye | G06F 9/3848 |
| | | | 712/240 |
| 2006/0288195 A1 | 12/2006 | Ma et al. | |
| 2007/0083736 A1 | 4/2007 | Baktha et al. | |
| 2011/0307688 A1 | 12/2011 | Nurvitadhi et al. | |

FOREIGN PATENT DOCUMENTS

| | | | |
|---|---|---|---|
| JP | 2001-306324 A | 11/2001 | |
| JP | 6043374 B2 | 12/2016 | |
| TW | 518516 B | 1/2003 | |

OTHER PUBLICATIONS

Notice of Reasons for Rejection for foreign counterpart Japan Application No. 2015-010321, dated May 10, 2016, 6 pages.
Akira Nakamura, Tech I, "Introduction to Microprocessor Architecture", vol. 20, Japan, CQ Publishing Co., Ltd., Hisaki Masuda, Apr. 1, 2004, 4 pages.
Non-Final Office Action for U.S. Appl. No. 14/228,690, dated Jun. 30, 2016, 17 pages.
Notice of Preliminary Rejection for foreign counterpart Korea Application No. 10-2015-0026821, dated Jun. 29, 2016, 14 pages.
Office Action and Taiwan Search Report for foreign counterpart Taiwan Application No. 104105377, dated Aug. 24, 2016, 9 pages.
Decision for Grant for foreign counterpart Japan Application No. 2015-010321, dated Sep. 13, 2016, 3 pages.
Examination Report for foreign counterpart United Kingdom Application No. GB1500942.6, dated Sep. 1, 2016, 5 pages.
Notice of Allowance for U.S. Appl. No. 14/228,690, dated Nov. 22, 2016, 27 pages.
Notificaton of Reason for Refusal for foreign counterpart Korea Application No. 10-2015-0026821, dated Dec. 28, 2016, 15 pages.
Notification of Grant for foreign counterpart Great Britain Application No. GB1500942.6, dated Mar. 21, 2017, 2 pages.
First Office Action and Search Report for foreign counterpart China Application No. 201510091809.4, dated Mar. 21, 2017, 31 pages.
Notice of Allowance for foreign counterpart Korea Application No. 10-2015-0026821, dated Apr. 25, 2017, 3 pages.
Notice on Grant of Patent Right for Invention from foreign counterpart China Patent Application No. 201510091809.4, dated May 14, 2018, 4 pages.
Intention to Grant a patent for United Kingdom Application No. GB1500942.6, dated Feb. 6, 2017, 2 pages.
Notification of Reasons for Refusal from foreign counterpart Japan Patent Application No. 2016-221057, dated Feb. 14, 2019, 3 pages.
Nakada et al., "An Instruction Scheduling Method with VLIW Instruction Queue for Superscalar Processors," Journal of the Information Processing Society of Japan, Information Processing Society of Japan, Jul. 2, 2009, vol. 2 No. 2., 19 pages (Best Available Copy).

* cited by examiner

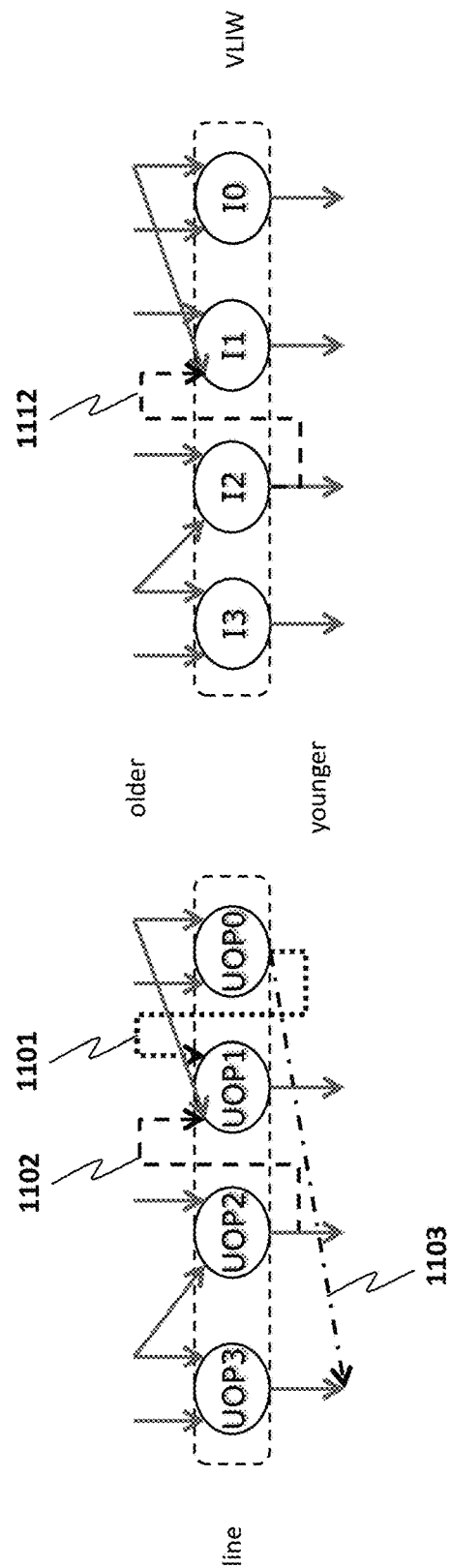

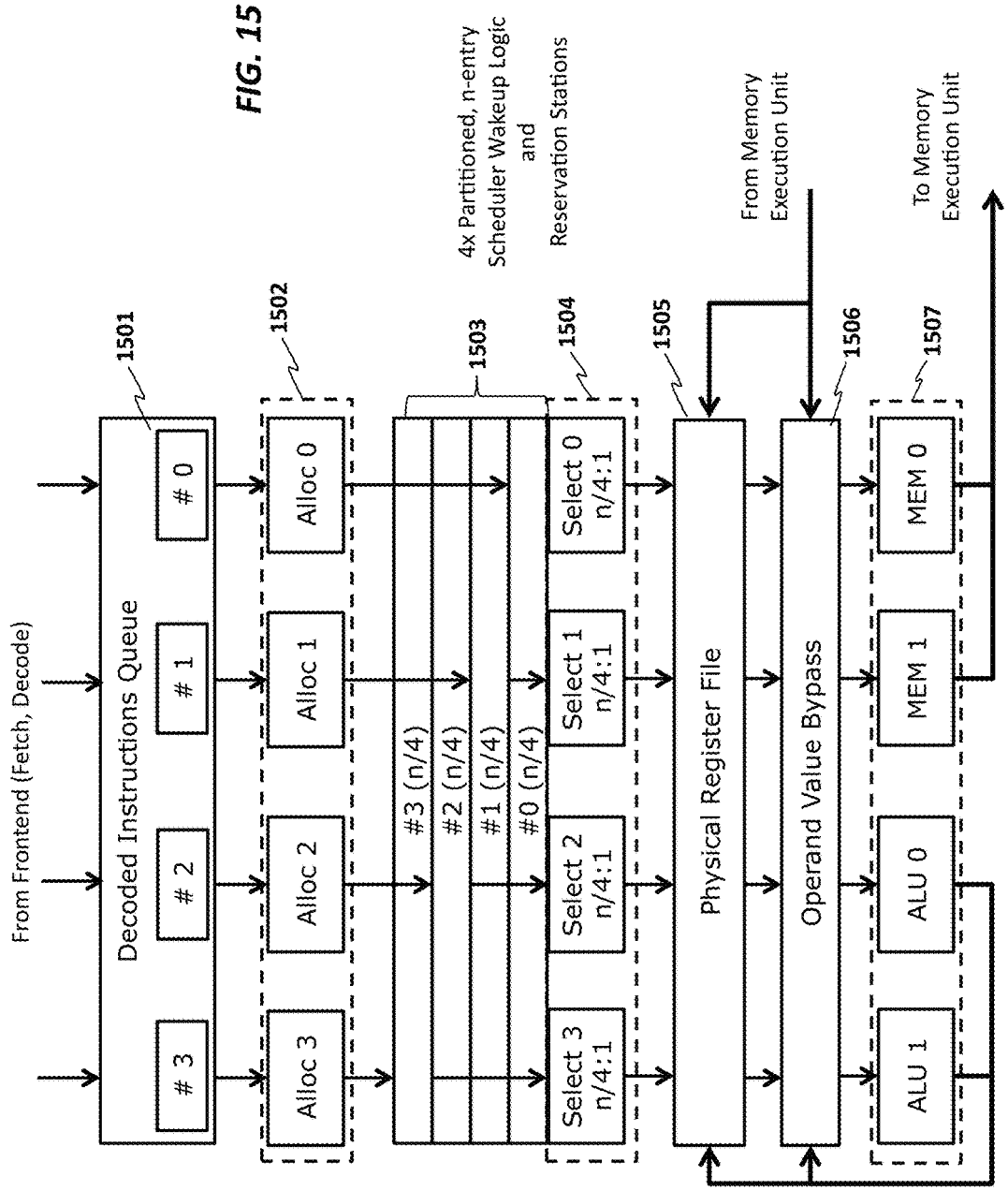

METHOD AND APPARATUS FOR IMPLEMENTING A DYNAMIC OUT-OF-ORDER PROCESSOR PIPELINE

CROSS-REFERENCE TO RELATED APPLICATIONS

This application is a continuation of application Ser. No. 14/228,690, filed Mar. 28, 2014, which is hereby incorporated by reference.

BACKGROUND

Field of the Invention

This invention relates generally to the field of computer processors. More particularly, the invention relates to an apparatus and method for implementing a dynamic out-of-order processor pipeline.

Description of the Related Art

Many mainstream processors are currently based on dynamic out-of-order microarchitectures, which share more or less same high-level principles of out-of-order pipeline implementation. Improving the performance of these processors, power efficiency, area density, and hardware scalability becomes increasingly more difficult with each generation of the hardware-only out of order designs.

BRIEF DESCRIPTION OF THE DRAWINGS

A better understanding of the present invention can be obtained from the following detailed description in conjunction with the following drawings, in which:

FIGS. 11A-B illustrate a dependencies between a plurality of conventional micro-operations (uops) adjacent in binary code and a plurality of syllables;

FIG. 15 illustrate one embodiment of a processor pipeline following a decode stage.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

Figure 1:
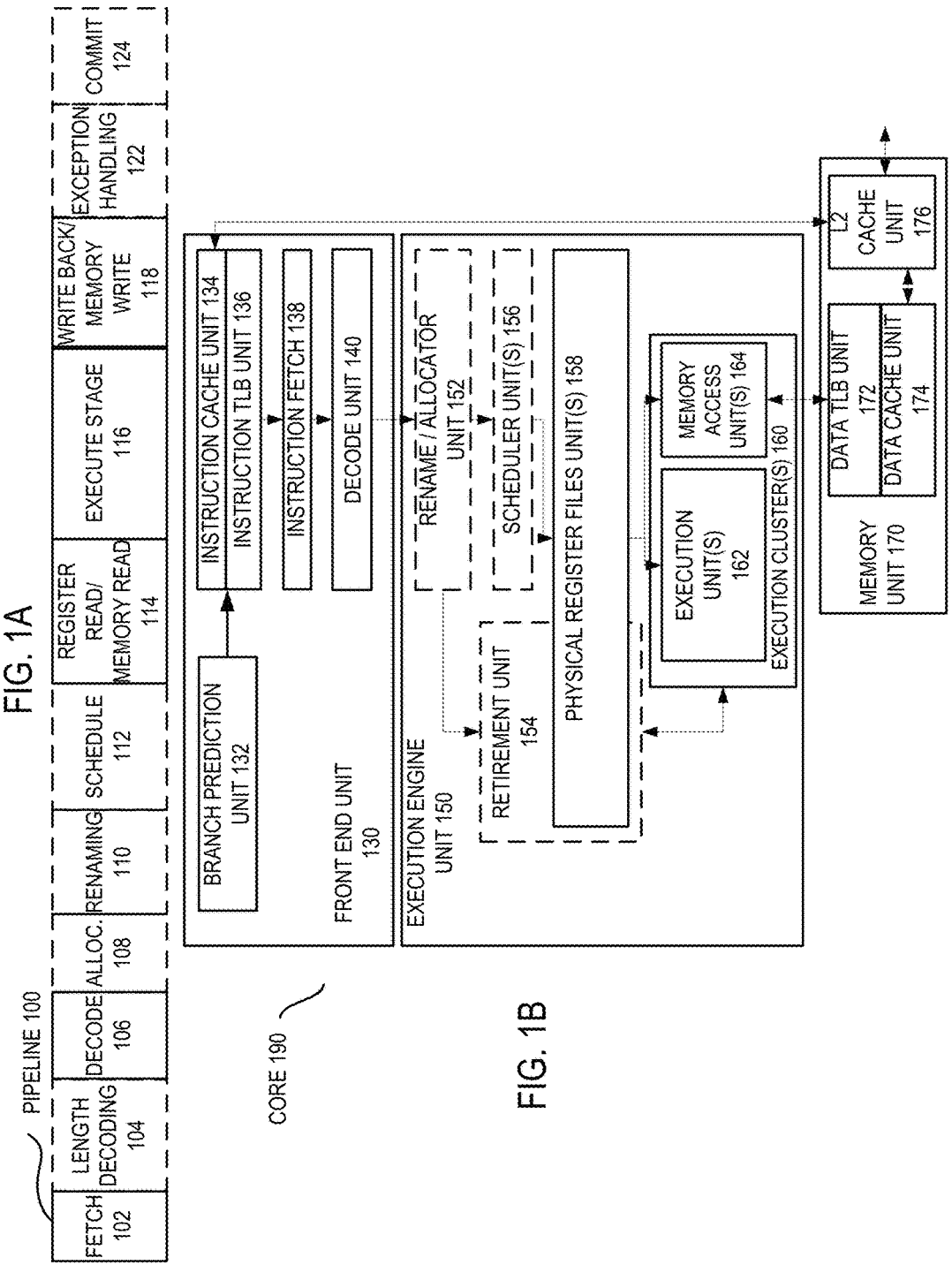
FIG. 1A is a block diagram illustrating both an exemplary in-order pipeline and an exemplary register renaming, out-of-order issue/execution pipeline according to embodiments of the invention.
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
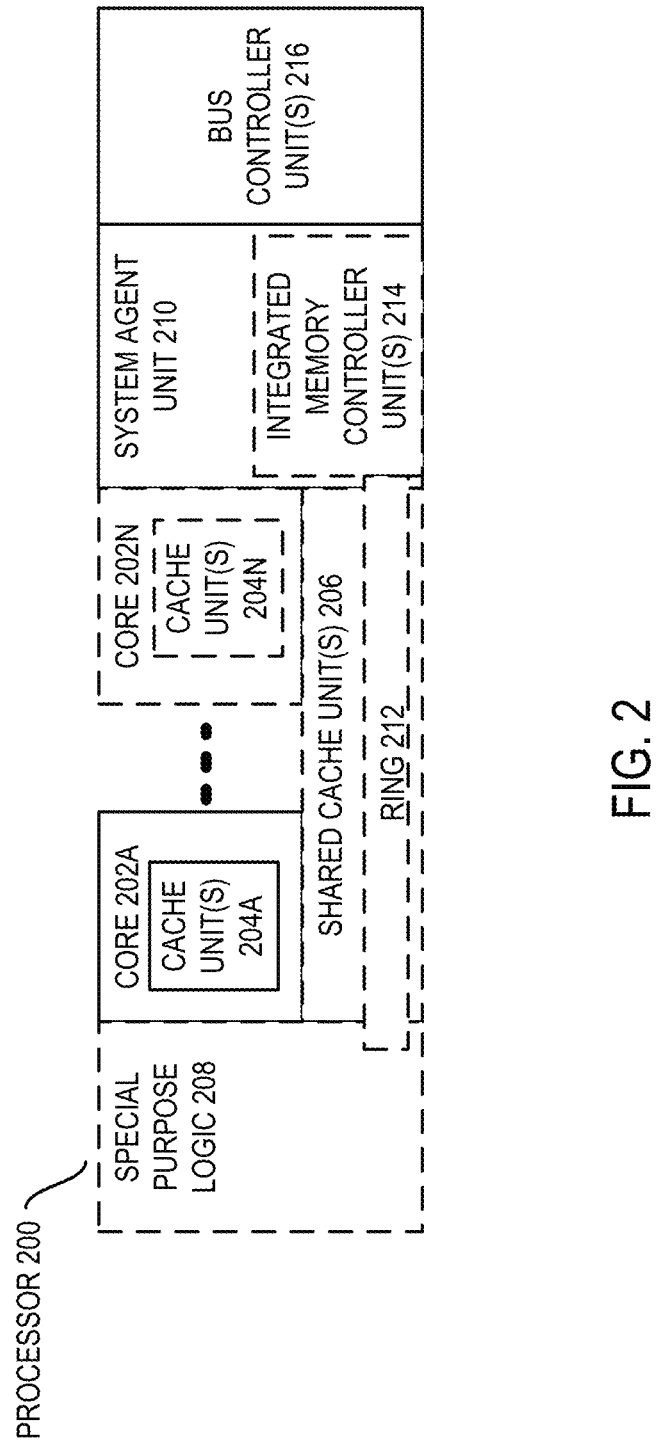
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
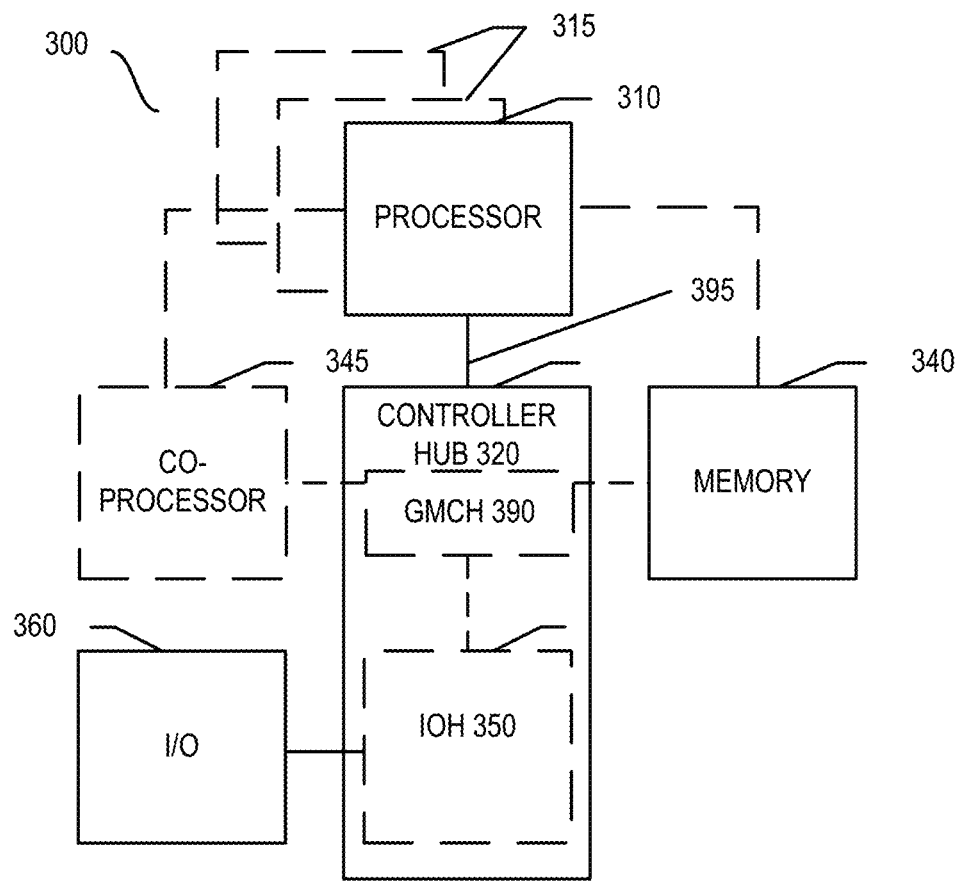
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
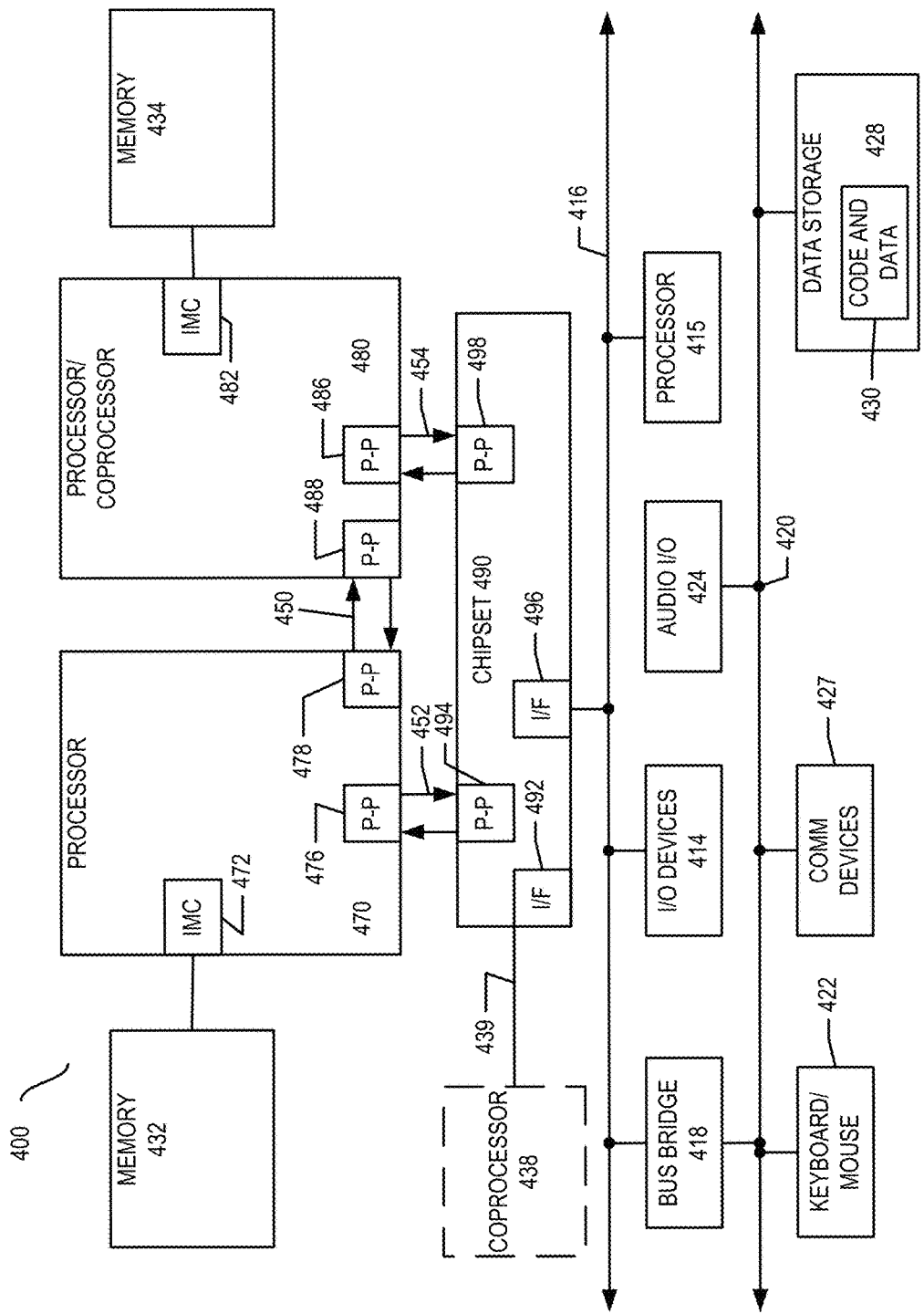
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
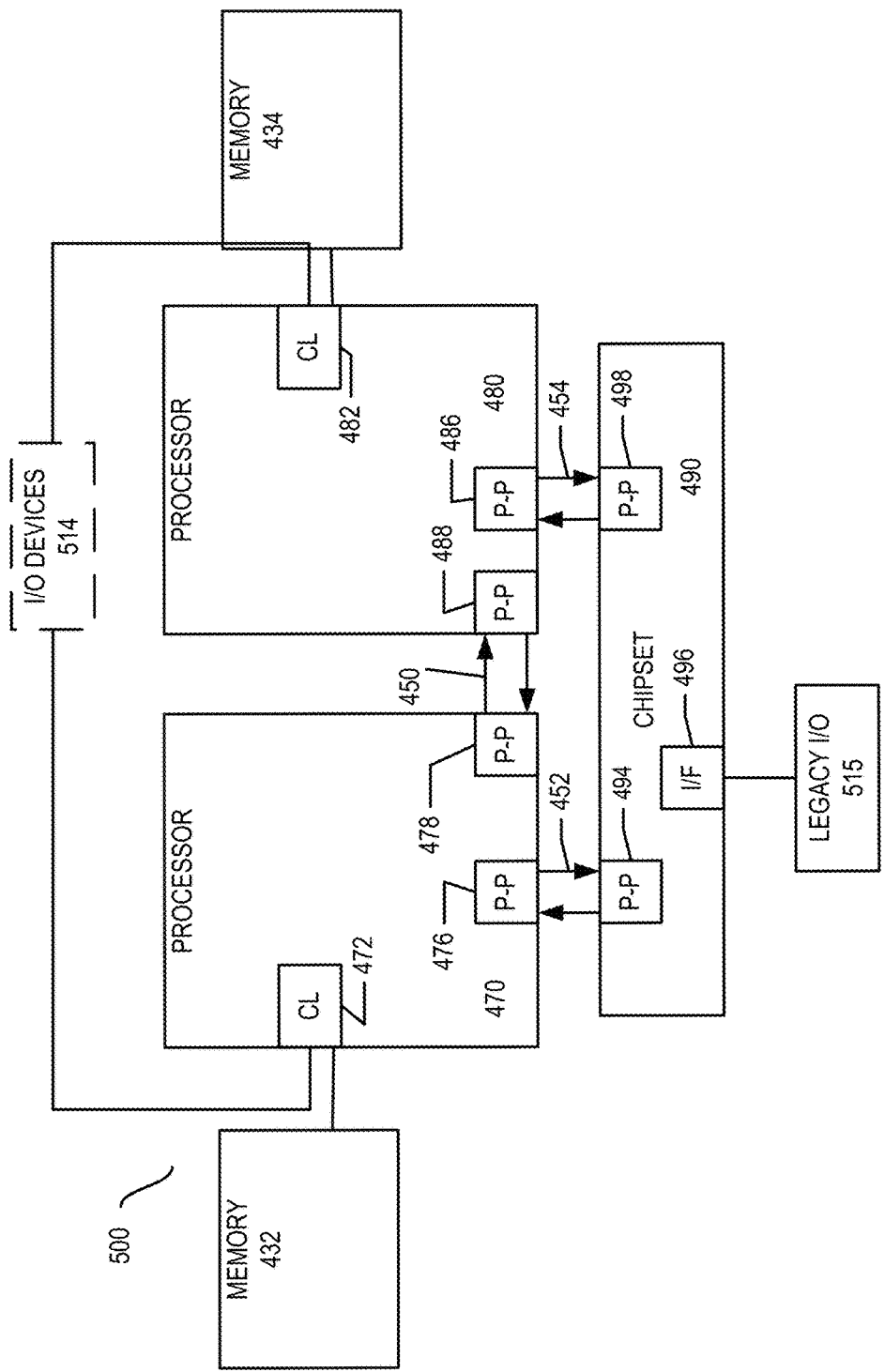
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
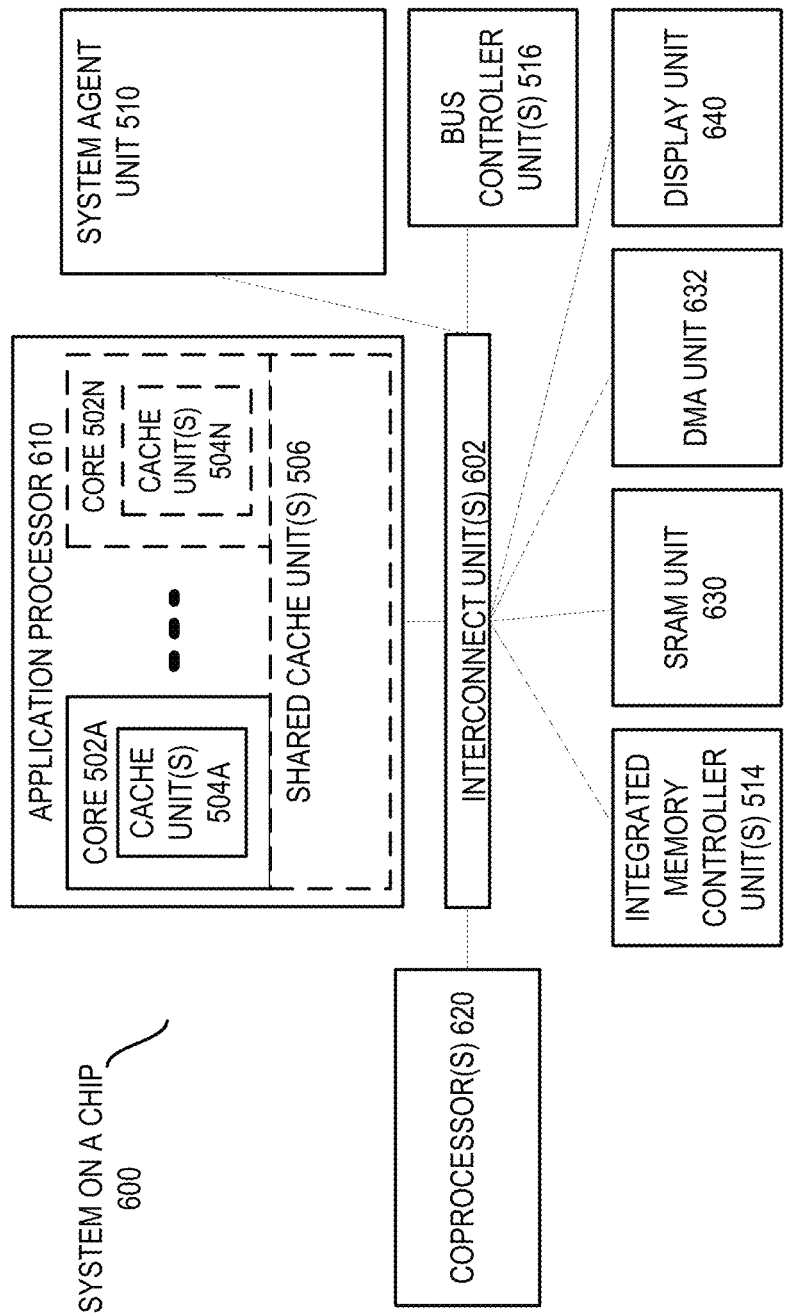
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
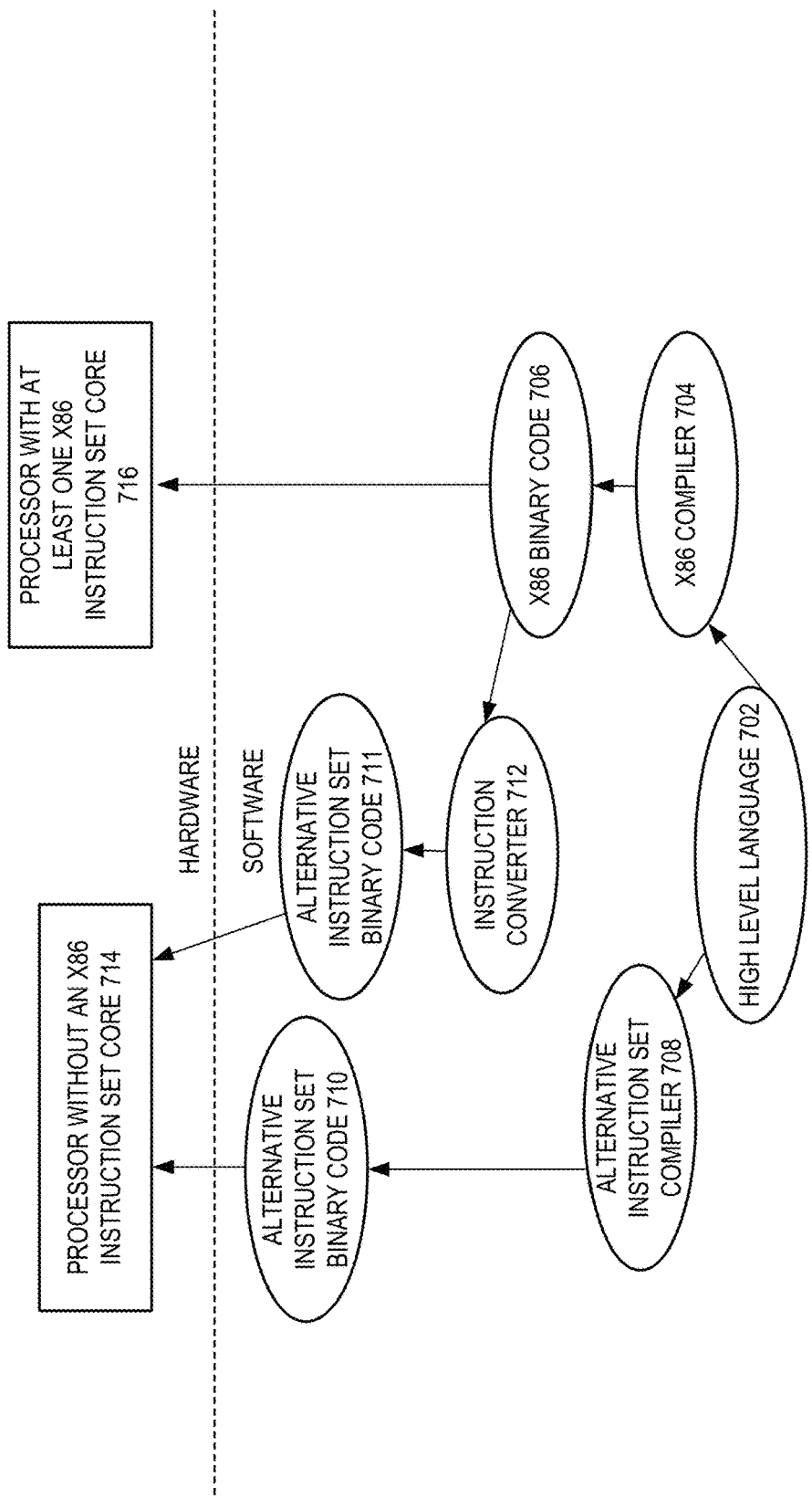
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.).

The instruction converter 712 is used to convert the x86 binary code 706 into alternative instruction set binary code 711 that may be natively executed by the processor without an x86 instruction set core 714. This converted code may or may not be the same as the alternative instruction set binary code 710 resulting from an alternative instruction set compiler 708; however, the converted code will accomplish the same general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Apparatus and Method for Implementing a Dynamic Out-of-Order Processor Pipeline

One embodiment of the invention includes an optimized implementation of a dynamic out-of-order pipeline which addresses the limitations of existing out-of-order and in-order VLIW processor implementations in numerous ways. The hardware improvements are achieved with the help of specially defined (e.g., private) instruction set architecture (ISA) features and a co-designed software optimizer, which may be an optimizing compiler 708 or a binary translator (e.g., converter 712) for the ISA (see FIG. 7). Significantly, the new optimized hardware pipeline retains and enhances all of the basic principles of dynamic out-of-order execution in hardware. One additional valuable feature that the embodiments of the invention enable is the significantly improved hardware scalability for wider-issue out-of-order processor designs.

Some embodiments set forth below are designed based on the observation that a conventional out-of-order pipeline supporting any conventional ISA (e.g., such as the Intel® Architecture (IA)), must ensure correct superscalar execution by hardware of every valid code sequence in the ISA. However, if an out-of-order microarchitecture is designed for a new reduced instruction set computer (RISC)-like ISA that defines certain restrictions on the code sequences allowed for hardware execution, similar to some of the restrictions in Very Long Instruction Word (VLIW) ISAs, the implementation of the out-of-order pipeline hardware can be substantially optimized in a number of ways.

Particular optimizations are described in this patent application as a package of closely related ISA-dependent or ISA-derivative inventions. The new ISA can be either private or public. Dynamic Binary Translation (dBT) technology is optionally used to translate from existing binary codes (e.g., IA) to the new private ISA and enable full binary compatibility with existent software. In FIG. 7, for example, the dBT technology may be implemented by instruction converter 712 to convert x86 binary code 706 to native binary code adapted for execution on the processor architecture described herein. Alternatively, an optimizing compiler to the new public ISA, such as compiler 708 in FIG. 7, may be used to produce executable binaries 710.

Significantly, in one embodiment, the new hardware optimizations do not change the basic principles of the out-of-order pipeline, but only its implementation. As such, the optimized pipeline mirrors the traditional conceptual flow of instructions: in-order superscalar fetch and allocation of instructions, dynamic dataflow scheduling engine (out-of-order), and in-order superscalar retirement of instructions. This both ensures the hardware feasibility and helps to match the high performance expectations across a wide range of general-purpose software applications.

The described embodiments of the invention allow for a significant number of hardware optimizations—simplifications, reductions, and enhancements—in the superscalar out-of-order pipeline implementation. The following features are implemented by these embodiments:

dramatic frontend hardware optimizations, similar to those in the frontend of an in-order processor;

simplification and reduction of the size of out-of-order engine allocation, scheduler setup, and retirement units, downstream the out-of-order pipeline;

elimination of several critical inter-stage dependencies in the allocation pipeline and the reduction of some pipeline stages, making the segment of out-of-order pipeline more parallel;

latency reduction for several critical pipeline stages that enables a wider dynamic operating frequency/voltage range for an out-of-order processor;

a partitioned design of many hardware structures along the pipeline, as well as their read/write ports reduction, beyond what is feasible or practical in conventional out-of-order processors;

elimination of large cross-bar (multiplexing) structures at several stages of the out-of-order pipeline and highly parallel, loosely partitioned organization, in part of the data-path and control buses; and improved utilization of expensive out-of-order hardware structures (e.g., reservation station, buffers, etc.) of a given size, compared to the conventional out-of-order designs.

In one embodiment, the improved utilization mentioned above is enabled in the rest of the out-of-order pipeline by exploitation in the hardware of in-order organization complexity of the effects of out-of-order instruction fetch, allocation to backend, and retirement with respect to the original program order. All the features, in turn, enable better hardware scalability for wide-issue, out-of-order processor designs.

(0) Introduction

The traditional paradigm for defining architecture of a hardware/software co-designed processor assumes that methods of co-design with a software code optimizer are applied through specially-defined ISA features to enable some new Instruction-Level Parallelism (ILP) concept in hardware, which has to be dramatically different in organization and/or ILP exploitation principles from the contemporary mainstream out-of-order pipelines. However, none of the prior attempts have been competitive in performance and/or efficiency when compared to conventional hardware-only out-of-order pipelines.

The embodiments of the invention are based on a new paradigm for hardware/software co-design that targets implementation of out-of-order pipeline instead. The optimizations in hardware pipeline implementation include:

ISA-optimized out-of-order Pipeline with VLIW Frontend and Retirement/Commit Units
ISA-optimized hardware Register Renaming
ISA-optimized Scheduler Setup Logic and Pipeline
ISA-optimized Instruction Cancelation Setup Logic and Pipeline
Combined Scheduler Setup and Cancelation Setup Logic
Combined Scheduler Wakeup and Cancelation Logic
Delayed hardware Register Renaming
Non-Speculative Early Dispatch of Instructions
Fully Partitioned Organization of Optimized out-of-order Pipeline
Partitioned Instruction Allocation Unit
Reduction of Allocation (Write) Ports in Optimized out-of-order Pipeline
Out-of-Order Allocation of out-of-order Engine in Optimized Pipeline
Hardware-enhanced VLIW Code Schedule for Optimized out-of-order Pipeline
ISA-optimized Instruction Retirement Unit
ISA-optimized Clustered Organization of the out-of-order Pipeline.

Most of the out-of-order pipeline optimizations are directly based on new, specially defined ISA features. The new ISA can be either private or public. As mentioned, dBT technology can be used to translate from existing (e.g., IA) binary codes to the new private ISA and enable full binary compatibility with existent software. Alternatively, an optimizing compiler to the new public ISA is required to produce executable binaries.

Without loss in generality, the embodiments described below assume the use of dBT technology with the optimized out-of-order pipeline. The embodiments of the invention do not apply any special requirements to dBT implementation, and the specific details of dBT operation are not discussed below to avoid obscuring the underlying principles of the invention.

(1) Special ISA Requirements for the Optimized Out-of-Order Pipeline

Figure 8:
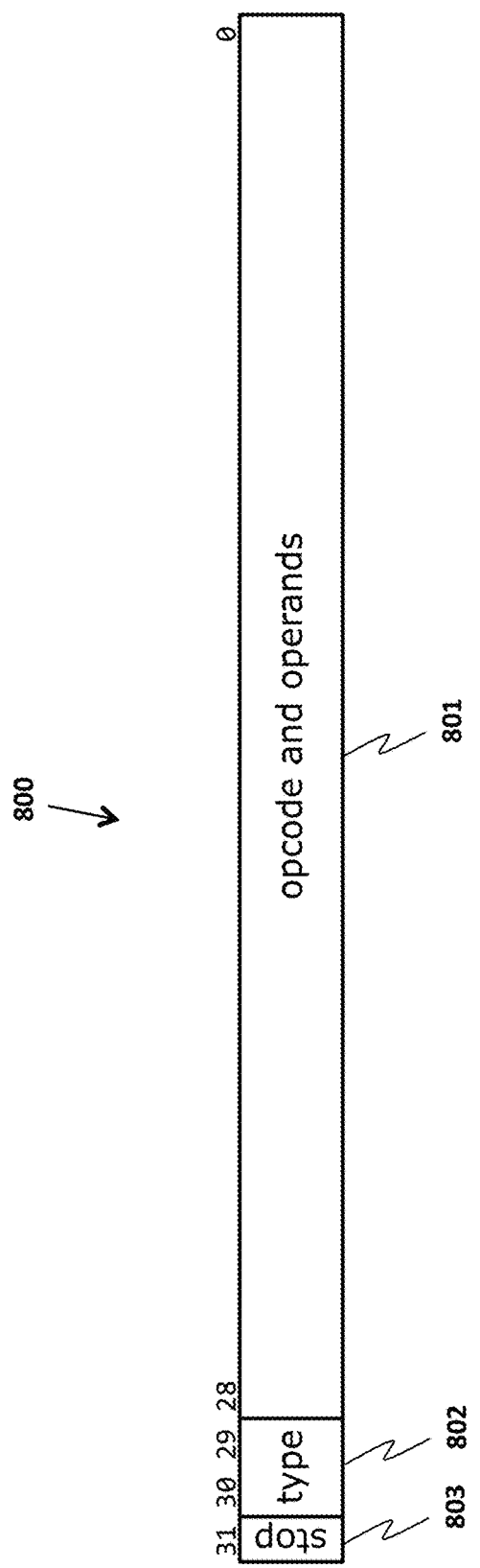
FIG. 8 illustrates one embodiment of an instruction format used for Very Large Instruction Word (VLIW) syllables.

As illustrated in FIG. 8, in one embodiment, the private ISA for the optimized out-of-order pipeline is a RISC-style, fixed length instruction format 800. In particular, a load-store ISA may be employed in which each fixed length instruction includes a 3-address register opcode/operand format 801 (e.g., dst, src1, src2) and explicit instruction type information 802 (e.g., memory, ALU, control). In addition, each instruction includes a stop bit 803 which, when set, explicitly marks the boundaries of very long instruction words (VLIWs) used in the private ISA.

Figure 9:
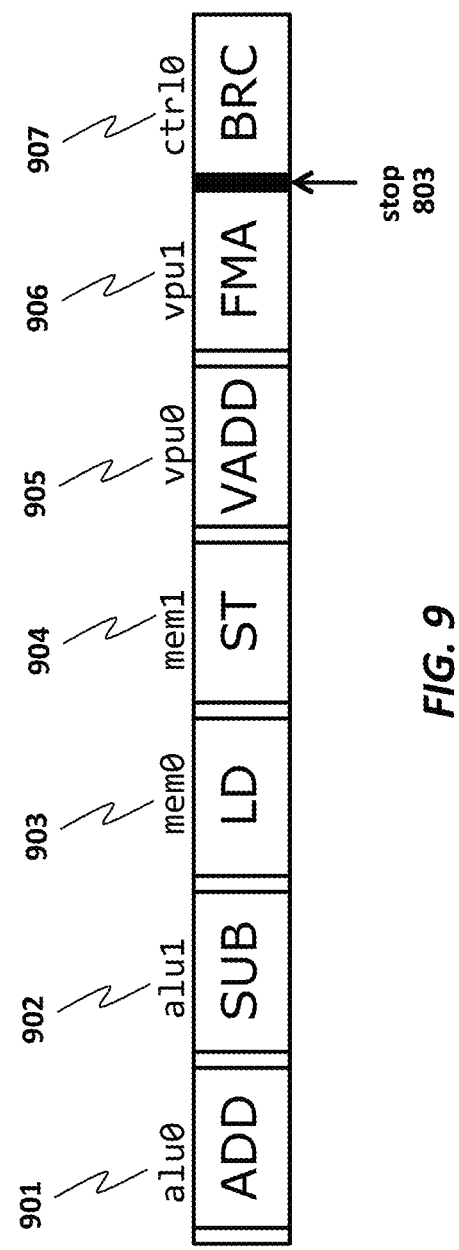
FIG. 9 illustrates one embodiment of a very long instruction word (VLIW) comprising a plurality of syllables.

One feature of the private ISA is that it defines a set of instruction grouping restrictions, which may include:

Individual RISC instructions (such as shown in FIG. 8) must be combined into an in-order sequence of groups that are usually called Very Long Instruction Words (VLIWs), one example of which is shown in FIG. 9. In particular, FIG. 9 illustrates a plurality of individual instructions 901-907 grouped into a single VLIW format. Thus, in one embodiment, the private ISA binary code comprises an in-order sequence of VLIWs. The individual RISC instructions in a VLIW are sometimes referred to as "syllables."

VLIWs can contain a variable number of syllables, up to some architecturally defined maximum value. Hence, the length of each VLIW is variable, but with a granularity of the fixed-length RISC syllables in it. A set value of a stop bit 803, which is present in each syllable encoding explicitly marks the boundaries of VLIWs and is used by the hardware pipeline to identify separate VLIWs. A limit may be specified for the number of symbols of a certain type within each VLIW (e.g., no more than one control instruction per VLIW).

In one embodiment, syllables within a VLIW do not have true data-flow (read-after-write ("R-A-W")) or false output (write-after-write ("W-A-W")) data-flow register operand dependencies between each other. False anti-data-flow dependencies (e.g., write-after-read ("W-A-R")) may be allowed within a VLIW (see, e.g., FIGS. 11A-B and associated text below). These restrictions effectively mean that, except for memory operations, there is no program ordering relations between syllables in a VLIW.

In one embodiment, VLIWs obey program order. That is, a syllable in a given VLIW may have any data-flow dependence (R-A-W, W-A-R, or W-A-W) on a syllable in another, preceding VLIW that is older (i.e., fetched earlier) in the program order of VLIWs.

In some embodiments of the private ISA, the relative position of a syllable in a VLIW can define the type of the syllable. For example, instructions of a given type may be strictly ordered in a VLIW with respect to instructions of the same type and with respect to instructions of the other types. In addition, the position of a symbol may define a particular instruction dispatch port (i.e., hardware pipe) in the superscalar pipeline (e.g. ALU0, ALU1, etc.) to which the syllable must be steered by hardware. For example, in FIG. 9, instruction 901 is an add operation which may be directed to alu0 based on its position. In some embodiments, control instructions (e.g., such as branch BRC shown in FIG. 9) can occupy only certain allowed relative positions in the VLIW code.

A particular VLIW is shown in FIG. 9 which includes up to 7 syllables. It is shown to have one control syllable 907, (up to) two floating-point vector syllables 905-906, (up to) two memory (load, store) syllables 903-904, and (up to) two integer ALU syllables 901-902. A set stop bit 803 in the control (BRC) syllable marks the boundary of the VLIW instance.

Figure 10B:
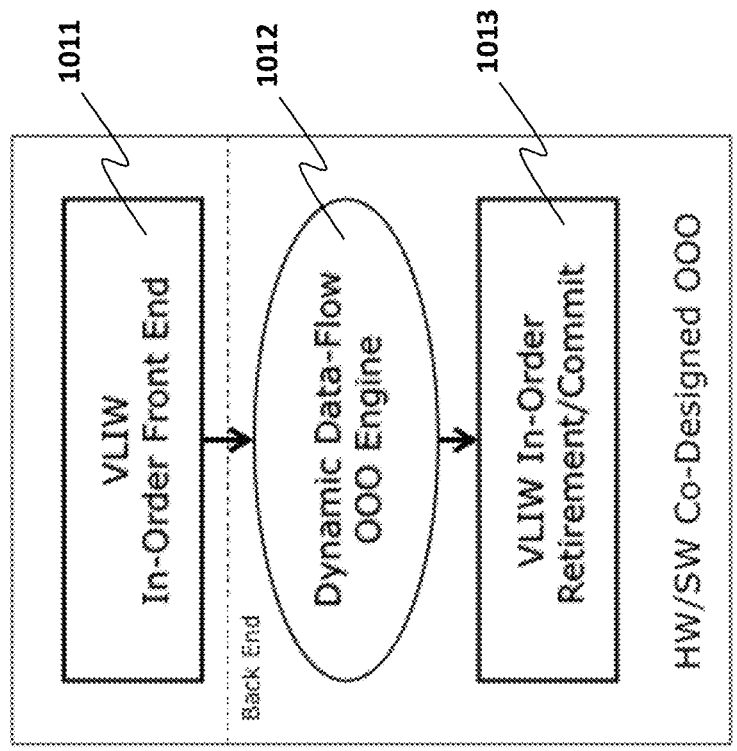
FIGS. 10A-B illustrate a conventional out of order (OOO) pipeline and an OOO pipeline in accordance with one embodiment of the invention.
Figure 10A:
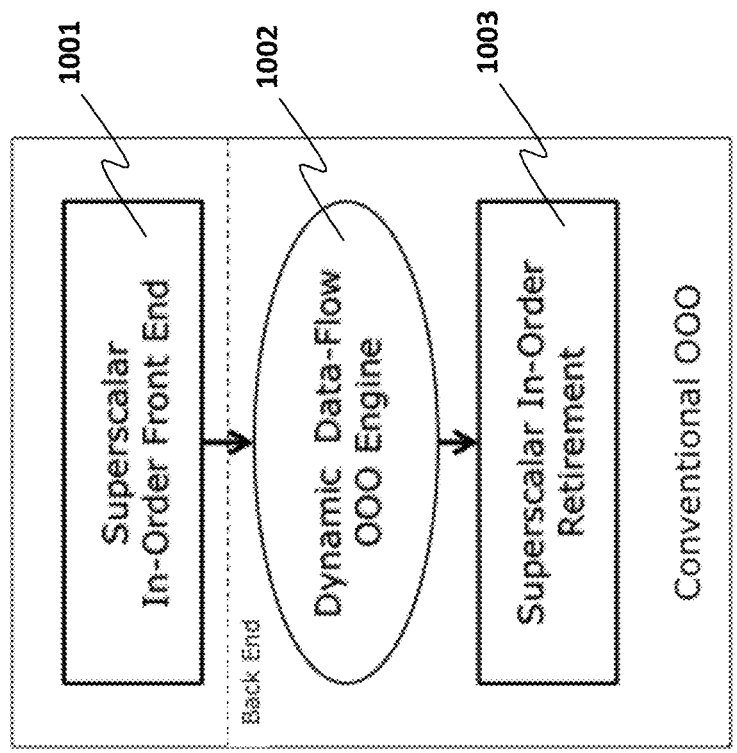

(2) ISA-Optimized Out-of-Order Pipeline with VLIW Frontend and Retirement/Commit Units The hardware optimizations employed in one embodiment of the invention are compared below with a conventional out-of-order pipeline implementation. A high-level structure of the optimized out-of-order pipeline is presented side-by-side with the conventional out-of-order pipeline in FIGS. 10A-B. One difference between the two pipelines is that the optimized pipeline uses in-order VLIW frontend units 1011 and retirement/commit units 1013 instead of in-order superscalar front end units 1001 and in-order superscalar retirement units 1003, respectively, in the conventional pipeline. In one embodiment, the units of the optimized out-of-order pipeline operate on one VLIW per clock cycle.

Referring back to FIG. 1B, front end units 1001 and 1011 may include components shown in front end unit 130; data flow engines 1002 and 1012 may include components from execution engine unit 150 (e.g., except for 154 in one embodiment) and memory unit 170; and retirement units 1003 and 1013 may include components from retirement unit 154.

In one embodiment, the optimized pipeline allocates the out-of-order syllables from no more than one VLIW per clock cycle. Unlike the dynamically generated allocation "line" of uops in the conventional pipeline, a VLIW may be pre-defined statically by the dBT optimizer and explicitly provided to hardware with a guarantee that ISA restrictions were applied during grouping of the RISC instruction syllables into the VLIW.

After allocation to the dynamic data-flow out-of-order engine 1012 in the optimized pipeline, a VLIW is decomposed into its separate syllables, so that the engine may schedule them independently, in a similar (but not identical) manner as the data-flow engine 1002 schedules separate uops in the conventional out-of-order pipeline.

(3) Basic Organization of Out-of-Order Engine Allocation in the Optimized Pipeline FIG. 11A illustrates an example of a superscalar allocation "line" of micro-operations ("uops") in a conventional out-of-order processor side by side with a corresponding entity in the optimized out-of-order pipeline, the VLIW, in FIG. 11B.

A superscalar allocation line of uops can contain almost any of the R-A-W (shown as dotted arrow 1101 connecting the output of uop0 to the input of uop1), W-A-R (shown as the dashed arrow 1102 connecting the output of uop2 to the input of uop1), and W-A-W (show as the alternating dash-and-dot arrow 1103 exiting uop0 and arriving at the output of uop3) register dependencies between the uops resulting from a conversion of a valid macro-instruction (ISA) sequence in the processor frontend to microcode. Hence, the conventional out-of-order pipeline has to check for and correctly handle all the possible intra-line (or "inline") dependencies in each and every allocating line of uops. In addition, the conventional allocation hardware must keep track of and properly enforce the original program ordering relations between the uops in a line. The requirements substantially complicate the implementation of the allocation hardware in a conventional out-of-order pipeline and severely impede the hardware scalability for wider out-of-order processor designs.

In contrast, using a VLIW implementation, as shown in FIG. 11B, a corresponding allocation entity in the optimized out-of-order pipeline must obey the earlier described private ISA restrictions on allowed dependencies between the syllable instructions in a VLIW. The restrictions are typical for traditional VLIW ISAs, and prohibit true data-flow (R-A-W) dependencies and false output (W-A-W) dependencies between syllables in a VLIW. False anti-dependencies (W-A-R) between syllables are allowed, as indicated by dashed arrow 1112 connecting the output of I2 to the input of I1 in FIG. 11B. The private ISA definitions also mean that, except for memory instructions, there is no program ordering relations between different syllables in a VLIW. As such, the syllables from a single VLIW can be processed by the out-of-order pipeline hardware in any order with respect to each other and without any complications to the correctness of their out-of-order processing. It is the responsibility of the dBT software to translate the original binary code into a fully semantically equivalent and valid private ISA code, obeying all the restrictions for the optimized out-of-order pipeline.

(4) ISA-Optimized Hardware Register Renaming

Figure 12B:
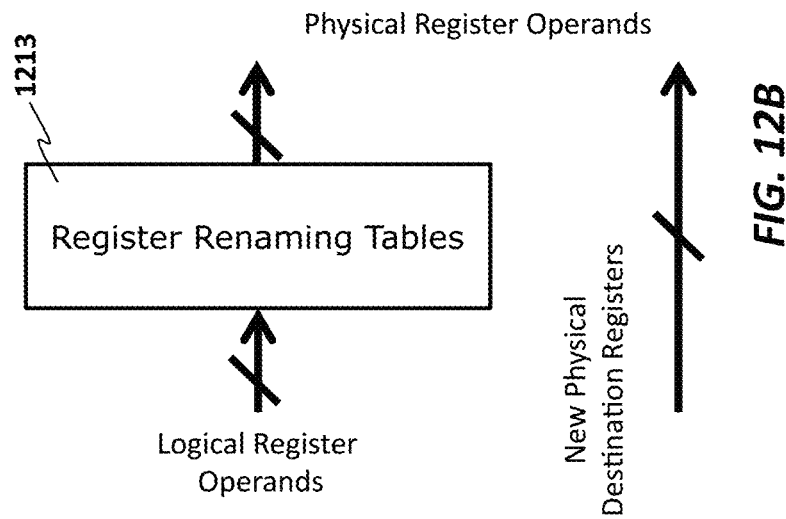
FIGS. 12A-B illustrate register renaming in a conventional processor and register renaming employed in one embodiment of the invention.

As illustrated in FIG. 12B, similarly to a conventional out-of-order pipeline, the optimized pipeline described herein relies on a hardware register renaming unit 1213 to map the private ISA logical register operands onto a larger number of physical registers available in the microarchitecture. One purpose of register renaming is to eliminate false W-A-R and W-A-W register dependencies and, thus, increase the level of exploitable parallelism in running code.

Figure 12A:
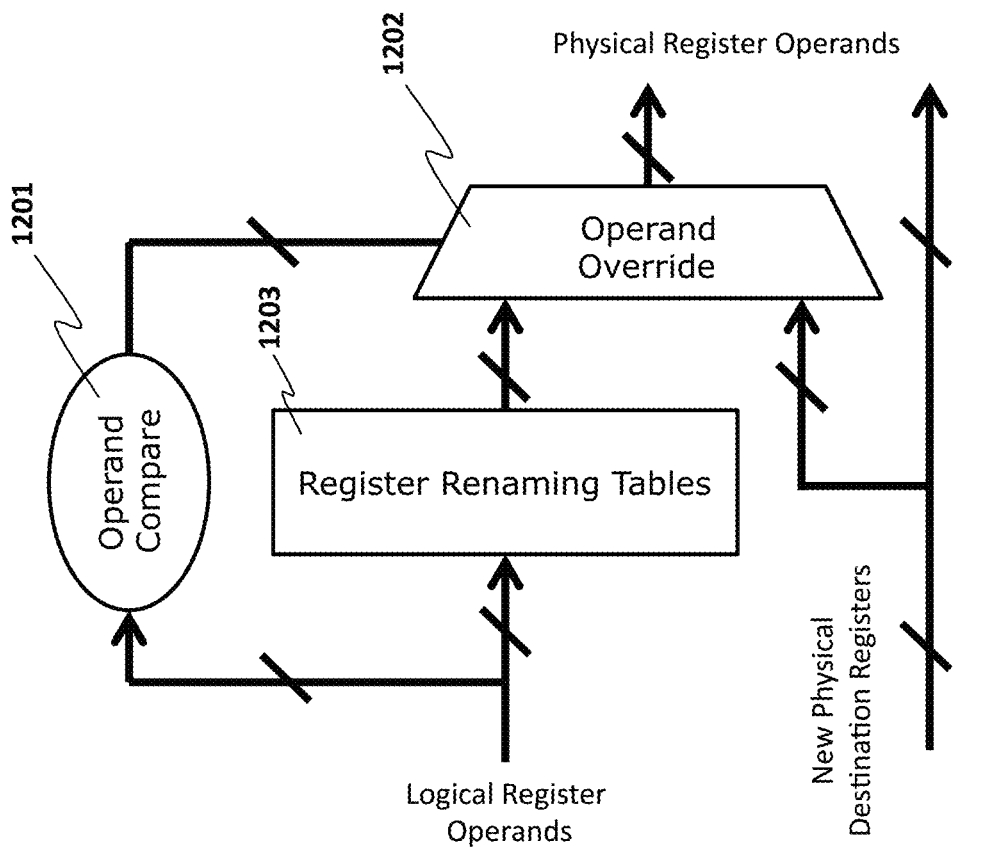

FIGS. 12A-B provide a comparison of register renaming in conventional pipeline (FIG. 12A) and optimized out-of-order pipeline (FIG. 12B). As illustrated, a significant amount of additional circuitry is required in the conventional pipeline to resolve dependencies including operand comparison circuitry 1201 and operand override circuitry 1202 (typically implemented as a large multiplexor). In contrast to FIG. 12A, only the register renaming tables 1213 are required in the optimized pipeline shown in FIG. 12B. The simplifications and improvements are based on the fact that there are no R-A-W and W-A-W dependencies between syllables in a VLIW. Thus, the renaming unit does not need to check for the dependencies and enforce them (because they do not exist). This simplification eliminates the logical register operand comparators 1201 and correspondent physical register operand inlining multiplexors 1202 in the read phase of register renaming. This latter hardware reduction is especially significant, because the multiplexors 1202 occupy large, wire dominated areas and increase the overall latency of the register renaming stage. The removed multiplexors are also the worst scalable part of renaming unit in wider-issue processor designs.

In one embodiment, the false W-A-R anti-dependencies allowed in a VLIW are eliminated in the optimized pipeline similarly to the conventional out-of-order pipeline by delaying the register renaming write phase by one half of a clock cycle with respect to the register renaming read phase.

The hardware implementation of the register renaming write phase in the optimized out-of-order pipeline is simplified by a guaranteed absence of false W-A-W output dependencies between syllables in an allocating VLIW, so that the register renaming hardware does not need to check for the dependencies and correctly handle them before updating the register renaming tables 1213.

(5) ISA-Optimized Scheduler Setup Logic and Pipeline

Figures 13A, 13B:
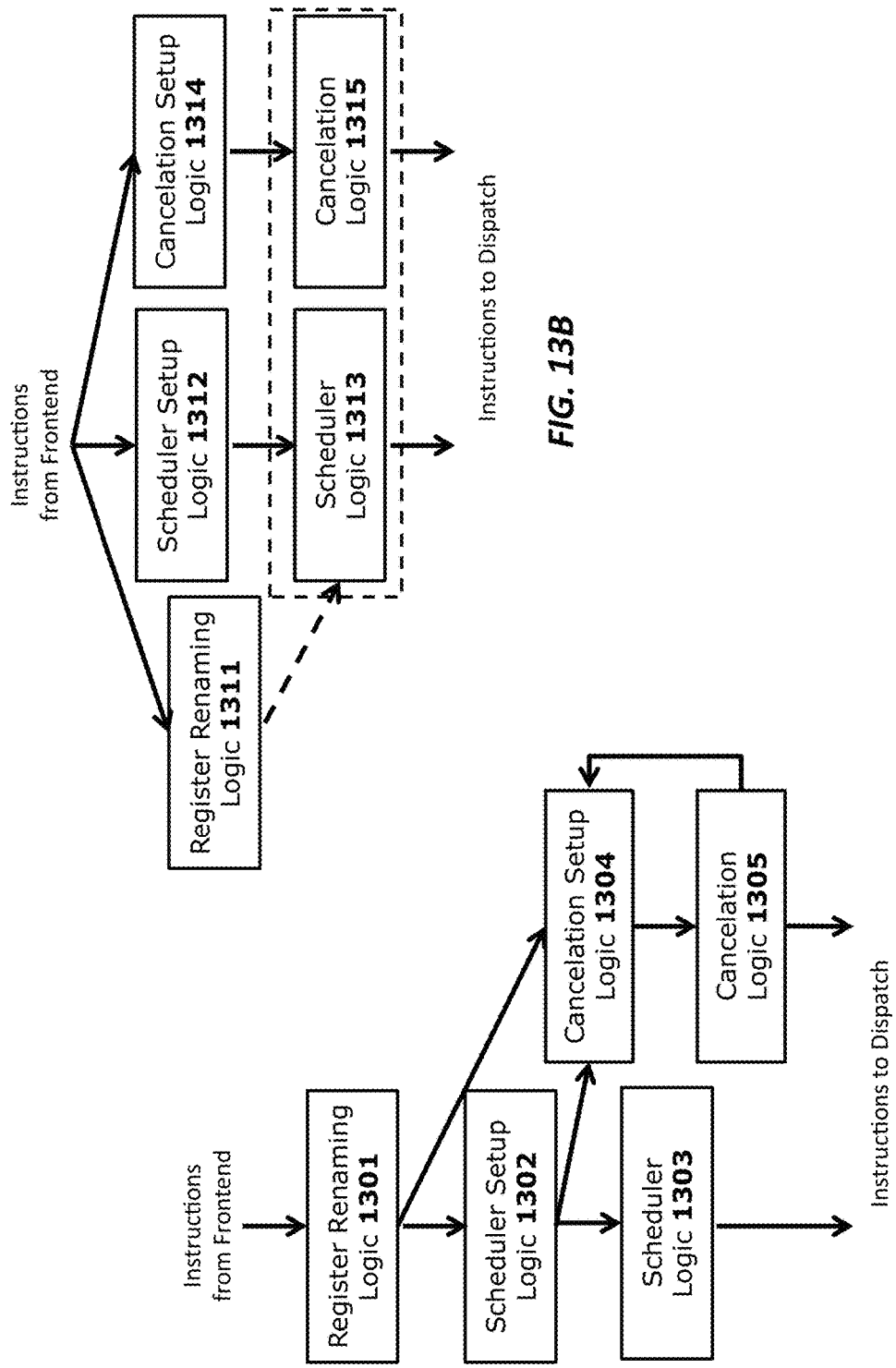
FIGS. 13A-B illustrate register renaming, scheduler logic, and cancellation logic in a conventional OOO processor in an accordance with one embodiment of the invention.

The next improvement that the optimized out-of-order pipeline enables in its allocation segment relates to the setup logic of the data-flow scheduler. FIGS. 13A-B provide a comparison of allocation and setup logic in a conventional pipeline (FIG. 13A) and optimized out-of-order pipeline (FIG. 13B). In particular, FIG. 13A illustrates a serial arrangement of register renaming logic 1301, scheduler setup logic 1302 and scheduler logic 1303, as well as cancellation setup logic 1304 and cancellation logic 1305. FIG. 13B illustrates an improved parallel arrangement for the register renaming logic 1311, scheduler setup logic 1312 and cancellation setup logic 1314, as well as scheduler logic 1313 and cancellation logic 1315.

As mentioned above, any out-of-order pipeline eliminates false W-A-R and W-A-W from the allocating code to increase its exploitable parallelism and considers only true data-flow dependencies (R-A-W). However, the complexity and time criticality of detecting and eliminating the false dependencies inside the allocation line of uops in a conventional out-of-order pipeline forces it to serialize scheduler setup logic 1302 with respect to the register renaming logic 1301. The register renaming logic 1301 eliminates the false dependencies, and the scheduler setup logic 1302 uses its results to consider (setup) only the true R-A-W data-flow dependencies. This simplification, however, increases the length of the allocation pipeline and delays the earliest time when an allocating instruction can be dispatched.

In contrast, the embodiment of the optimized out-of-order pipeline shown in FIG. 13B does not need to handle any intra-VLIW register dependencies, so that the scheduler setup logic 1312 performs scheduling setup in parallel with the register renaming performed by the register renaming logic 1311. This implementation reduces the overall length of allocation pipeline (removes stages) and allows dispatching instructions earlier, which improves the performance after branch misprediction recovery and after the instruction cache misses. Besides, the shorter allocation pipeline improves utilization of the out-of-order engine's resources via reducing the minimal resource turnaround latency.

In one embodiment of the optimized allocation pipeline, the scheduler setup logic 1312 uses logical ISA registers identifiers of a syllable's operands as input information (for example, indexed by logical register operands), rather than larger physical register identifiers. In addition, the scheduler setup logic 1312 does not need to check for even the true R-A-W data-flow dependencies between syllables in an allocating VLIW. These features allow for the typical content addressable memory (CAM) used in the scheduler setup to be replaced with a simpler and smaller table-based scheduler setup logic 1312. In one embodiment, the setup table maps each scheduler entry with the latest in allocation order producer instruction for a logical register to a correspondent logical register; if the latest producer instruction for a logical register is already executed, the setup table reports the register as having no dependencies on any instruction at scheduler. The improved scheduler setup logic 1312 still needs to handle false W-A-R anti-dependencies between allocating syllables, which may be implemented by delaying the scheduler setup logic write phase by one half of a clock cycle with respect to the scheduler setup logic read phase. In addition, as with register renaming (FIG. 12B), the scheduler setup logic 1312 does not need to handle false W-A-W output dependencies during the write phase, as such false output dependencies are restricted in the described private ISA.

(6) ISA-Optimized Instruction Cancelation Setup Logic and Pipeline

Many contemporary out-of-order pipelines implement speculative dispatching of instruction dependent on load operations, assuming the load will hit in the data cache, which is the statistically most frequent case for load execution. This optimization allows the consumer operations to receive loaded data earlier than if they would be dispatched non-speculatively. In a rare case when a load misses in the data cache, all the speculatively dispatched dependent operations must be selectively canceled in the out-of-order pipeline. The operations are later re-dispatched (re-played) by the out-of-order engine non-speculatively, when the missed load delivers data from lower levels of processor's memory hierarchy.

The speculative dispatch of load consumers is enabled by the instruction cancelation logic 1305 that tracks dependencies of uops allocated to the out-of-order engine on loads, including their indirect dependencies through other non-load uops on the scheduler. The dependence information is used to selectively cancel affected dispatched instructions in case a load misses in the data cache. Similarly to the data-flow scheduler setup, the conventional out-of-order pipeline performs the cancelation logic setup 1304 after the register renaming 1301 and uses both the renamed register information from 1301 and data-flow scheduler setup information from 1302 and previous cancelation setup information from 1305 to simplify the function of cancelation setup logic 1304. The setup function is still complicated because of the need to determine and track the indirect dependencies on loads through the allocation line of the uops, which includes serialized accesses to multiple hardware structures and complex merging of intermediate setup information.

Much alike the improvement of scheduler setup logic 1312, the optimized out-of-order pipeline improves the cancelation logic setup 1314, which is implemented in parallel with register renaming 1311 and scheduler setup 1312, and in a table-based, indexed by logical register operands fashion (i.e., CAM-free as discussed above for 1312). The improvement is similarly based on the guaranteed absence of R-A-W and W-A-W dependencies between syllables in an allocating VLIW.

The cancelation-specific identification and tracking of indirect dependencies on load instructions is also greatly simplified in the optimized pipeline by the absence of R-A-W and W-A-W dependencies in a VLIW, so that the overall complexity and latency of setting up the cancelation logic 1314 become equal to those for scheduler setup logic 1312. W-A-R dependencies are similarly handled by delaying the write phase of cancelation logic setup 1314 by one half of a clock cycle with respect to its read phase. In one embodiment, the write phase of cancelation logic setup 1314 can use the results of the read phase of cancelation logic setup 1314 as one of the inputs.

(7) Combined Scheduler Setup and Cancelation Setup Logic

The overall optimizations of cancelation setup logic 1314 allow it to be combined in the optimized out-of-order pipeline with the scheduler setup logic 1312 into a single table, addressable (indexed) by logical register identifiers of a syllable's operands. The combining is additionally based on the general fact that all the indirect data-flow dependencies are always resolved ahead of direct data-flow dependencies, as applied to the indirect dependencies on loads included in the instruction cancelation information.

(8) Combined Scheduler Wakeup and Cancelation Logic

In addition, the instruction cancelation information can now be kept on a data-flow scheduler's 1313 wakeup logic, along with true data-flow (R-A-W) dependence information for the instructions, rather than in a separate hardware structure, as with conventional out-of-order pipelines. The optimization is additionally based on the general fact that all the indirect data-flow dependencies are always resolved ahead of direct data-flow dependencies, as applied to the indirect dependencies on loads included in the instruction cancelation information.

All this means that the optimized out-of-order pipeline completely eliminates need for a separate instruction cancelation setup and tracking logic hardware, which has substantial power and area footprint in conventional out-of-order engine, while it is still fully capable to perform the selective instruction cancelation functions.

(9) Delayed hardware Register Renaming

Another optimization of the allocation pipeline implementation is based on the fact that the improvements of scheduler 1312-1313 and cancelation setup logic 1314, described above, eliminate the criticality of register renaming stage in the out-of-order pipeline.

For reference, conventional out-of-order pipelines require the register renaming 1301 to be completed as soon as possible. This is required because subsequent scheduler setup 1302 and cancelation logic setup 1304 functions depend on the information from the renaming stage.

In the new optimized out-of-order pipeline the register renaming phase 1311 may be delayed until the renamed register information is first needed, i.e., until before an instruction can be first dispatched from the data-flow scheduler in the pipeline. The delayed register renaming 1311 allows later allocation of free physical destination registers compared to the conventional pipeline, so that minimal physical register turnaround latency is shortened and a physical register file of a given size is better utilized. The elimination of register renaming criticality can be also used to optimize the physical layout of the out-of-order engine, as the requirements for placement of register renaming tables with respect to the other hardware structures in the allocation pipeline can now be relaxed.

(10) Non-Speculative Early Dispatch of Instructions

Contemporary out-of-order processors may implement the early dispatch of allocating instructions, which is performed in parallel with scheduler setup and instruction scheduling stages of their pipelines. The early dispatch of instructions improves processor performance, because many allocating instructions, especially after a branch misprediction recovery or after an instruction cache miss, are actually ready to be dispatched at their allocation time. However, the information related to instruction readiness is not available in the conventional pipeline at this early stage. As a result, the pipeline does the early dispatch speculatively, by assuming that any allocating instruction can be ready at its allocation time.

Later in the conventional pipeline, the processor checks to determine whether the speculatively-dispatched instruction is actually ready and, if not, it cancels the instruction. The cancelation of mispeculated early dispatched instructions requires special hardware support and incurs additional power overhead.

The optimizations of the scheduler setup logic 1312 and allocation pipeline, described above, make the instruction readiness information readily available early enough, so that the optimized out-of-order pipeline can perform non-speculative early dispatch of only the ready instructions, thus eliminating the power overhead of the cancelations, as well as associated cancelation hardware.

(11) Fully Partitioned Organization of Optimized Out-of-Order Pipeline

Another significant improvement in the optimized hardware implementation of the out-of-order pipeline is based on the exploitation of ISA-defined, strict relative ordering between instructions (syllables) of different types in a VLIW (e.g., such as ALU, memory, control, etc) as well as on the defined absence of specific program ordering relations between syllables in a VLIW, except for memory operations.

In addition, one embodiment of the private ISA defines strict relative ordering of instructions of the same type within a VLIW. That is, if several instructions of the same type (e.g., two ALU instructions) are present in a VLIW, one embodiment of the ISA defines the specific dispatch ports to which each of the instructions must be steered by hardware.

For multiple memory instructions in a VLIW, one embodiment of the ISA defines their relative program ordering of memory accesses, depending on the memory dispatch port to which they must be steered. For example, in one embodiment, a VLIW syllable associated with memory dispatch port 0 (MEM0) always contains a memory instruction that is older in program order relative to a VLIW syllable associated with memory dispatch port 1 (MEM1).

Figure 14A:
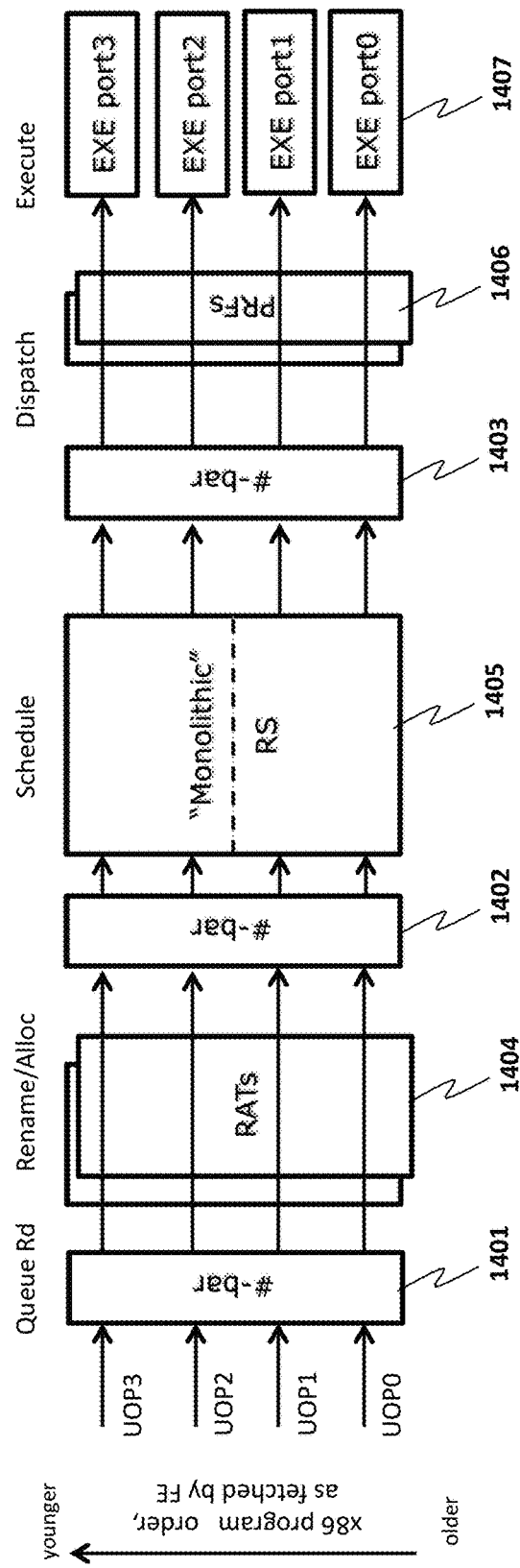
FIG. 14A illustrates a conventional pipeline including a plurality of crossbar switches between rename/allocate, schedule, and dispatch stages.
Figure 14B:
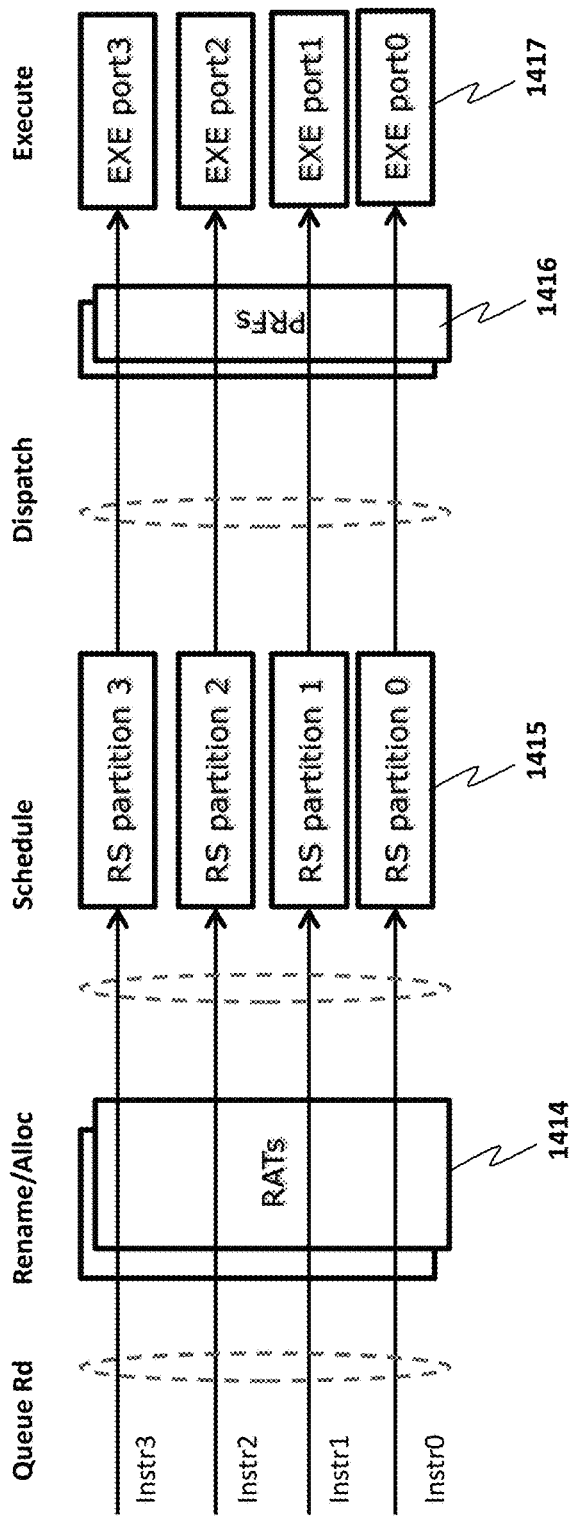
FIG. 14B illustrates a pipeline in accordance with one embodiment of the invention including a rename/allocate stage, schedule stage, and dispatch stage.

One embodiment of the private ISA allows for a fully partitioned implementation of the optimized out-of-order pipeline, as shown in FIG. 14B. Each pipeline partition, or hardware pipe, is associated with a particular hardware dispatch port, e.g., ALU0, ALU1, MEM0, MEM1, CONTROL, etc. The pipeline partitions function either independently or loosely coupled with each other, substantially simplifying the processor hardware design, validation, and manufacturing. The partitions also enable simple, streamlined, and more parallel physical layouts for out-of-order engine implementation.

In one embodiment, an encoded VLIW is represented in memory in compacted form, as defined in private ISA. That is, a VLIW may not contain all possible syllable types, or there may not be as many syllables of the same type as hardware dispatch ports for the type of instructions; however, these missing syllables don't occupy any space in instruction memory. In one embodiment, the frontend pipeline 1011 expands a compacted VLIW and places all its present syllables (instructions) into correspondent pipeline partitions. From this point in the optimized out-of-order pipeline the instructions are processed only by pipeline partitions to which they were steered according to the private ISA definitions.

In one embodiment, such pipeline partitioning allows for elimination of large multiplexors and cross-bar switches in the optimized pipeline compared to the conventional one. This happens because the relative ordering of instructions, defined in the private ISA for a VLIW, exactly matches the relative topology of hardware structures and their read/write ports in the out-of-order processor layout, so that no additional multiplexing, or steering of instructions, or their control fields, to particular hardware structures is required throughout the pipeline.

Comparison of the conventional and optimized out-of-order pipelines from the decoded instruction queue read stage to the execute stage is shown in FIGS. 14A-B. In particular FIG. 14A illustrates a sequence of uops 0-3 switched to the rename/allocation stage 1404 via a first crossbar switch 1401. A second crossbar switch 1402 couples uops from the rename/allocate stage 1404 to the scheduling stage 1405 which includes a monolithic reservation station (RS). A third crossbar switch 1403 within the dispatch stage couples the scheduling stage 1405 to the physical register files 1406 to read the dispatched uops' operands and to execution ports 1407 to which the uops are dispatched.

In contrast, in FIG. 14B, several cross-bar switches and multiplexors are eliminated. In particular, the cross-bar 1401 is eliminated at the register renaming stage 1404 that routes logical register operand fields of instructions placed in their program order to specific types of register renaming tables (or RAT) and to specific read or write ports in the tables. This crossbar becomes redundant in the optimized pipeline, as the ordering of syllables in a VLIW directly matches the RAT hardware topology. Thus, in FIG. 14B, instructions 0-3 are fed directly into the rename/allocate stage 1414. In some embodiments, lesser ordering restrictions, as compared to the conventional ISAs for out-of-order processors, can be defined in private ISA when required, so that the cross-bar is not completely eliminated, but its complexity, power, latency, and area are substantially reduced.

Also eliminated in FIG. 14B is the cross-bar 1402 at the scheduler allocation stage that routes instructions placed in their program order to specific partitions (or logical sections) of the data-flow scheduler 1405 (or Reservation Stations, RS). This cross-bar 1402 becomes redundant in the optimized pipeline, as the ordering of syllables in a VLIW directly matches the hardware topology of the data-flow scheduler's partitions 1415 in FIG. 14B. In some embodiments, lesser ordering restrictions, as compared to the conventional ISAs for out-of-order processors, can be defined in the private ISA when required, so that the cross-bar is not completely eliminated, but its complexity, power, latency, and area are substantially reduced.

Also eliminated is the crossbar 1403 at the instruction dispatch stage that routes dispatched instructions from their locations (partitions) in the data-flow scheduler (RS) 1405 to specific physical register files 1406 and their specific read ports, as well as to specific instruction execution ports 1407. This crossbar becomes redundant in the optimized pipeline, as relative placement of partitions of the data-flow scheduler 1415 exactly matches the hardware topology of the register files 1416 and their read ports, as well as the instruction execution ports 1417.

Some of the contemporary conventional out-of-order processor pipelines also implement a partitioned organization of the data-flow scheduler (RS); however, this feature allows them to eliminate only the latter crossbar 1406 at the instruction dispatch stage, but not any other crossbars. Besides, the conventional out-of-order pipelines with partitioned RS have to implement extra hardware units that steer allocating instructions to proper partitions and make sure that utilization of different instruction executions ports, associated with each of the partitions, is balanced. In one embodiment, the optimized out-of-order pipeline doesn't require the extra partition load balancing hardware units and relies on code optimizer software to do the execution port load balancing in the binary code it generates. The latter load balancing information is implicitly conveyed to the optimized hardware pipeline via VLIW's syllable ordering definitions in a private ISA mentioned earlier.

The eliminated multiplexors and cross-bar switches lead to a substantial reduction in latency (i.e., enable higher clock frequency), power, and area in the optimized out-of-order pipeline. The positive effect will be even more significant with future finer silicon manufacturing processes, as the multiplexors and switches are wire-dominated hardware structures, and wires have been scaling down relatively worse than silicon devices in the finer processes.

Crossbar elimination enables better scalability of hardware implementation of the optimized out-of-order pipeline for wider processor designs, as the area and latency of the crossbar-switch-style hardware structures scale poorly (about quadratic) with a linear increase in the number of their inputs/outputs. It is important to note that the optimized out-of-order pipeline may still employ multiplexors in the frontend pipeline to route decoded instructions from an expanded VLIW to proper pipeline partitions. It may also still use multiplexors for operand bypassing at the dispatch, execute, and writeback stages of the pipeline (see FIG. 15). In the remaining stages, the optimized out-of-order pipeline becomes free of multiplexors and cross-bar switches.

FIG. 15 illustrates one embodiment of an optimized 4-wide out-of-order engine with an n-entry data-flow scheduler which includes several 4× partitioned pipeline stages. In particular, the illustrated embodiment includes a 4× partitioned decoded instruction queue 1501 for storing 4 decoded instructions (e.g., syllables from a VLIW); a 4× partitioned allocation unit 1502 for allocating instructions to processor resources; a 4× partitioned, n-entry scheduler wakeup logic and reservation stations 1503 with a 4× partitioned set of (n/4):1 instruction selection logic 1504; a set of physical register files 1505, operand bypass logic 1506; and a plurality of functional units 1507. In one embodiment, for all of the four partitions of the scheduler wakeup logic and reservation stations 1503, there are a total of n entries for storing n instructions awaiting execution and each of the partitions stores n/4 of the n instructions. By way of example, for a value of n=32, each of the partitions 1503 stores 32/4 or 8 instructions (in 8 entries), and each of the select logic partitions 1504 can select one out of up to 8 ready instructions from a 8-entry wakeup logic partition 1503 associated with it in the pipeline.

In one embodiment, each partition of the scheduler wakeup logic 1503 may be configured to store only a certain type of instructions to simplify the routing of those instructions to the execution units 1507. For example, in FIG. 15, partitions #2 and #3 may store ALU instructions and partitions #0 and #1 may store memory instructions (because these instructions are easily routed form the partitions to their respective execution units).

The allocation logic 1502 includes only one write port to each of the 4 partitions in the scheduler wakeup logic. In addition, the 4× partitioned selection logic 1504 includes one read port to each of the partitions 1503 and is capable of selecting four instructions per cycle—one from each of the partitions 1503 (e.g., using a set of four 8:1 multiplexors in one embodiment). Thus, the 4× partitioning of the pipeline dramatically decreases the silicon area required to implement the scheduler wakeup logic 1503 and selection logic 1504 because each partition in the scheduler wakeup logic 1503 requires only a single read port and a single write port. That is, each partition of the selection logic 1504 only needs to be capable of selecting one of n/4 instructions from each of the four partitions, with total selection complexity of 4×((n/4):1) (as opposed to n instructions which would result in a non-partitioned implementation, with total selection complexity of n:4). In one embodiment, the select logic 1504 observes all possible instructions which may be executed (i.e. have their operands ready), selects one instruction to dispatch from each partition based on variables such as the allocation age of the instructions and availability of instruction dispatch slots for assigned execution unit.

In the particular embodiment illustrated in FIG. 15, there are two memory execution channels (e.g., for load and/or store address instructions input to the physical register file 1505, operand value bypass unit 1506, and memory address generation units MEM0 and MEM1 1507) and two ALU channels.

Among other latency, power, and area benefits, the scheduler partitioning provides better hardware scalability for wider issue processor designs. Though the kind of scheduler scalability is not unique to the optimized out-of-order pipeline and can be found in some conventional pipelines, it is substantially facilitated in the optimized pipeline by the abilities to define longer VLIW formats in private ISA and to fill the longer VLIWs with instructions by dBT optimizer software.

(12) Partitioned Instruction Allocation Unit

Another hardware implementation improvement, which results from the fully partitioned organization of the optimized out-of-order pipeline, relates to the implementation of the instruction allocation unit 1502. The instruction allocation unit 1502 works during allocation stages of the out-of-order pipeline and is also partitioned, so that each its partition serves exactly one partition of the optimized pipeline and allocates to it no more than one instruction of only the partition's type (e.g. ALU or memory, etc.) per clock cycle. The partitioned allocation unit 1502 has reduced hardware complexity and total area, plus it has much better scalability for wider out-of-order processor designs.

(13) Reduction of Allocation (Write) Ports in Optimized Out-of-Order Pipeline

In one embodiment, the private ISA may restrict the maximum number of instructions of a specific type allowed in a VLIW. The restrictions may be used for additional reduction and simplification of the allocation hardware units (as discussed above) and of some related hardware structures in the optimized out-of-order pipeline.

For example, if a VLIW may not contain more than two memory operations (two loads, or one load and one store, or two stores), as shown in FIG. 9, such critical and large structures in the Memory Ordering Buffer (MOB) in 174 (see FIG. 1B), like the Load Buffer (LB) and the Store Buffer (SB), can have a reduced number of allocation (write) ports, compared with the MOBs in similar conventional out-of-order pipelines. The conventional pipelines must provision in hardware for the highest possible allocation rate of instructions of the same type, as this rate is not restricted by contemporary conventional ISAs (e.g., IA). For example, existing architectures need to be able to allocate (write) up to four loads simultaneously to the LB. The reduced number of write ports to MOB structures in the optimized pipeline described herein results in significant area and power reduction.

(14) Out-of-Order Allocation of out-of-order Engine in Optimized Pipeline

In one embodiment, better utilization of hardware resources is achieved in the optimized out-of-order pipeline as a result of the out-of-order allocation of the out-of-order engine. The effect of the out-of-order allocation naturally results from the requirement for the dBT optimizer to obey the private ISA restrictions on placing syllables in VLIWs. Specifically, there cannot be true data-flow (R-A-W) and/or false output (W-A-W) dependencies between syllables in a VLIW. The dBT optimizer fulfills the restrictions by proper re-ordering of, e.g., IA input instructions after translating them into the private RISC syllables, but before grouping them into VLIWs. As a result of the static code re-ordering, consumer (dependent) instructions are placed into subsequent VLIW(s) with respect to their producer instructions; and the consumer instructions in the optimized out-of-order pipeline are allocated to the out-of-order engine only in one of the next clock cycles with respect to the time of allocation of their producers.

Figure 16:
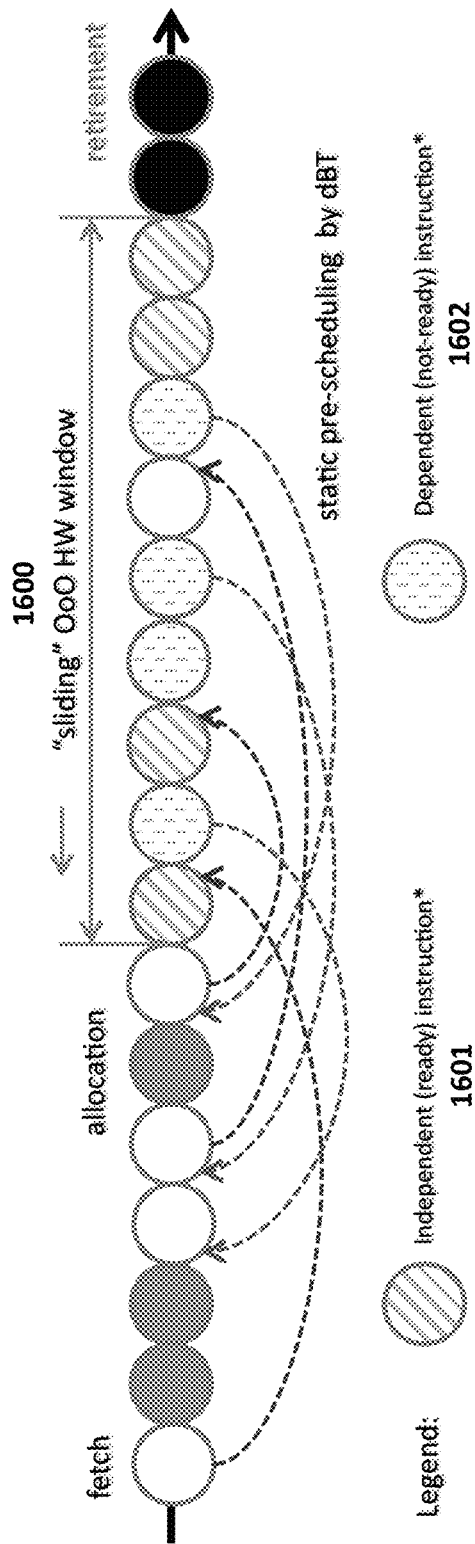
FIG. 16 illustrates one embodiment of rearranging a sequence of instructions based on instruction dependencies.

FIG. 16 illustrates an exemplary sequence of instructions (e.g., translated syllables) and shows the beneficial effect of the out-of-order code pre-scheduling (e.g., by the dBT optimizer). In particular, an out-of-order instruction "window" 1600 is utilized for a given hardware capacity. Syllables are moved into or out of the window based on dependencies. For example, several dependent instructions 1602 are shown being moved in front of the window (i.e., for a later execution time) and other independent instructions 1601 are shown being moved into the window (for an earlier execution time).

The delayed (out-of-order) allocation of consumer instructions has positive effect on the utilization of the data-flow scheduler's entries and of other hardware buffer resources in the optimized out-of-order pipeline, because a dependent instruction can only be dispatched (at the earliest) in the next clock cycle after the latest of its producer instructions is dispatched. Any earlier allocation would only waste the hardware resources.

In contrast, a conventional out-of-order pipeline has to routinely allocate both producing and consuming instructions in the same clock cycle, so that the hardware resources allocated for the consumer instructions are wasted for at least one clock cycle. This happens because its frontend unit 1001 cannot re-order uops in the microcode generated from the decoded instruction stream (e.g., IA stream); while the microcode for the instruction stream naturally has the consumer instructions adjacent to their producer instructions. For example, Load+ALU combinations of uops in microcode are typical for program codes and are frequently allocated to an out-of-order engine in the same clock cycle. Thus, the consumer ALU instruction may waste the hardware resources in the conventional pipeline for at least 3-4 clock cycles, depending on the latency of the producing load operation.

As a result of the differences in relative allocation of the producer and consumer instructions, a hardware data-flow scheduler of a given size in the optimized out-of-order pipeline observes on average more ready instructions than a similar scheduler in a conventional pipeline. Hence, the scheduler's entries are better utilized in the optimized pipeline, so either the size of the schedule can be reduced without a performance penalty, or a scheduler of a given size can serve a larger/wider out-of-order processor without limiting its performance, i.e., the effect of out-of-order allocation improves hardware scalability of optimized out-of-order pipeline.

It is important to note that the optimized out-of-order pipeline enables the out-of-order allocation without any additional hardware, as a byproduct of the code pre-scheduling into VLIWs performed by dBT software optimizer to obey the private ISA restrictions.

Similarly, the optimized out-of-order pipeline effectively fetches, decodes, and even retires instructions out of their original program order in an, e.g., IA input application. Nonetheless, the fronted, allocation, and retirement units in the optimized out-of-order pipeline still perform their simple in-order functions. The hardware size and complexity of the units are substantially less or, at least, the same as in a conventional out-of-order pipeline, which cannot exploit similar positive effects of out-of-order fetch and allocation without noticeable increase in frontend hardware and its complexity, like multi-threaded fetch in the frontend, instruction pre-scheduling/re-ordering unit in the frontend, etc.

(15) Hardware-Enhanced VLIW Code Schedule for Optimized Out-of-Order Pipeline

Considering the code (pre-)scheduling into VLIWs performed by the dBT software optimizer for the optimized out-of-order pipeline, it is important to point out several key improvements in the resulting VLIW code schedule with respect to a similar VLIW code schedule for a traditional in-order VLIW pipeline processors. In the traditional in-order VLIW pipeline, each VLIW is an atomic unit of fetching, decoding, allocation (or transfer to the backend pipeline), dispatching, and retirement/commit. That is, correspondent stages of the in-order pipeline act on an entire VLIW, i.e., on all its syllables simultaneously.

In contrast, in the optimized out-of-order pipeline a VLIW serves as an atomic unit of fetching, decoding, allocation, and retirement/commit, but not of dispatching. During the backend allocation stage a VLIW becomes split into individual syllables (RISC instructions) for the purpose of their independent dynamic scheduling and dispatching, potentially out-of-order, by the hardware data-flow scheduler. The presence of hardware data-flow scheduler in the optimized out-of-order pipeline enables enhanced VLIW code schedule for it, as it will be explained below.

The software code optimizer for a traditional in-order VLIW pipeline is in charge of creating exact (and superscalar, i.e. parallel) dispatching sequence of instructions. The dispatching sequence is precisely followed by the in-order pipeline. Hence, dependent instructions must follow their producing instructions in the traditional VLIW schedule by, at least, as far as the exact latency of the producing instructions. For the single-cycle producers the consumers can be placed in the next VLIW in a schedule. While for consumers of multi-cycle loads, full load latency (in number of VLIWs, as the maximum dispatch rate in the in-order pipeline is one VLIW per clock cycle) must be skipped before the consumers can be placed in VLIW code.

This does not present a big problem for scheduling codes with inherently high instruction-level parallelism and statically predictable control flow, like most inner loops with high trip count, because all vacant syllables in VLIWs between multi-cycle producers and their consumers can be easily filled by the software optimizer with other independent instructions.

However, for scheduling codes with low inherent parallelism and with many conditional branches, the traditional VLIW software optimizer has to inject many no-ops to the code schedule, only to guarantee that the hardware pipeline sees correct latencies between all multi-cycle producers and their consumers in the code schedule. The no-ops result in bubbles in the in-order hardware pipeline and cause under-allocation (i.e., under-utilization) of hardware resources in traditional VLIW processors, like those in the Itanium® Processor Family (IPF).

One embodiment of the optimized out-of-order pipeline contains hardware mechanisms that mitigate the inefficiencies found in traditional VLIW code schedule. Specifically, for codes with low parallelism, the dBT optimizer relies on the out-of-order engine's ability to dynamically accommodate the long latency of instructions entirely in hardware and assumes that all instructions to have unit (one clock cycle) latency, rather than enforce the actual instruction latencies, in the enhanced VLIW code schedule it generates. The unit latency assumption makes the schedule much more dense (compact) and free of no-ops, compared to the traditional VLIW schedule, that increases the backend allocation rate, but still provides the optimized out-of-order pipeline with sufficient information on correct dependencies between the instructions.

For codes with higher parallelism, one embodiment of the dBT software optimizer for the optimized out-of-order pipeline takes into account both the actual latencies of instructions, primarily the load instructions, and relative degree of criticality of particular instructions in a translated code region for the purpose of its faster execution. As a result, for the codes with high parallelism the enhanced VLIW code schedule obtains most of the features of a traditional VLIW code schedule: the producer and consumer instructions are separated in the schedule to account for the producer's latency, at least, partially, and more critical instructions are allocated to the out-of-order engine ahead of less critical instructions via their earlier placement in the VLIW code schedule. That is, the multi-cycle instruction latencies in codes with high parallelism are (partially) accommodated via the VLIW code schedule, rather than entirely by the out-of-order engine's hardware. The enhanced VLIW code schedule is yet dense (compact) and free of no-ops. Execution of the code schedule by the optimized out-of-order pipeline leads to a better performance for codes with high instruction-level-parallelism (ILP), and, as mentioned earlier, also allows for better utilization of the out-of-order hardware resources compared to a conventional out-of-order pipeline.

In one embodiment, the enhanced VLIW code schedule for the optimized out-of-order pipeline is generated opportunistically: the code schedule must correctly reflect the dependencies between instructions (dependent instructions are placed in separate VLIWs), but may not exactly follow the minimal latencies of the producing instructions in placement of their consuming instructions. This enhancement enables much better code schedule density and instruction allocation rates in the optimized out-of-order pipeline, compared with traditional in-order hardware pipelines that rely on similar VLIW ISA properties (e.g., as in the IPF processors).

In addition, the enhanced VLIW code schedule for optimized out-of-order pipeline reduces over-allocation of the out-of-order engine's hardware resources, typical in a conventional out-of-order pipeline, by not placing the producer and consumer instructions in the same VLIW and, thus, preventing them from being allocated to the out-of-order engine in the same clock cycle.

(16) ISA-Optimized Instruction Retirement Unit

In one embodiment, the retirement unit located in the retirement/commit region 1013 of the optimized out-of-order pipeline retires instructions strictly at the VLIW granularity, up to one VLIW per clock cycle (statically pre-defined by dBT optimizer). In contrast, a conventional out-of-order pipeline has to dynamically select in hardware a superscalar group ("line") of uops for retirement and account for possible pending interrupts and/or exception during the selection, as well as for the boundaries between the original macro-instructions (ISA) in the retiring stream of "lines" of uops.

In one embodiment, similarly to the allocation pipeline segment 1502, the hardware implementation of the retirement pipeline segment in 1013 is optimized because of the restrictions on syllables in a VLIW defined in the private ISA that the dBT software optimizer obeys when it generates code. Specifically, in one embodiment, there are no false output dependencies (W-A-W) between syllables in a VLIW and there is no program ordering in a VLIW (except for memory operations), so that the retirement unit hardware may not perform checks for the dependencies and can ignore the ordering during retirement, unlike the similar units in conventional out-of-order pipelines. The eliminated dependence and ordering check logic is typically the worst scalable hardware in the conventional retirement unit for the wide-issue out-of-order processor designs. In addition, because only one VLIW is retired per clock cycle in one embodiment, the exception detection and program counter update mechanisms in the optimized retirement pipeline do not need to be replicated for superscalar (i.e. parallel) retirement, as it is typically done for superscalar retirement of uops in a conventional out-of-order pipeline to carefully handle boundaries between macro-instructions (ISA) at the "lines" of uops level.

All of these features allow a simplified and loosely coupled partitioned hardware implementation of the ISA-optimized retirement unit with very high peak throughput.

For completeness, it is important to note that the re-order buffer (ROB) in the optimized out-of-order pipeline can also be implemented in a fully or partially partitioned fashion to enable improved integration with the optimized partitioned allocation and retirement units, and to support greater hardware scalability for wider-issue out-of-order processor designs.

These optimizations of the retirement unit imply that the precise architected register and memory state in the optimized out-of-order pipeline is supported with the precision of each VLIW (e.g., at boundaries between adjacent VLIWs, statically generated by the dBT optimizer software). The precise state is used in one embodiment for handling of hardware interrupts, execution exceptions, faults, etc.

One embodiment of the optimized out-of-order pipeline explicitly supports the private ISA definition for the architected register and memory state. It is the responsibility of dBT software to establish a reliable mapping of the precise private ISA state to the corresponding precise original binary code (e.g., IA) state, and to be able to reconstruct the subsequent correct register and memory state, when it is required for execution of a software application and as it is implied by the ISA of the original binary code (e.g. IA).

(17) ISA-Optimized Clustered Organization of the Out-of-Order Pipeline

One embodiment of the optimized out-of-order pipeline enables efficient implementation of clustered out-of-order microarchitectures via private ISA features and dBT optimizer software support. Clustered microarchitectures divide otherwise-monolithic and large hardware structures and resources into smaller parts (the clusters), so that their physical implementation becomes simpler, and hardware scalability is improved, as each of the parts has lower latency and can run at higher clock frequency than correspondent monolithic hardware structures.

The typical application of a clustered microarchitecture is in a wide-issue processor design that divides the physical register file and/or operand bypass network into two or more smaller clusters, e.g., an 8-wide out-of-order processor that is implemented as two 4-wide monolithic execution clusters and runs at clock frequency of a 4-wide processor. This clustered hardware implementation has an inherent performance overhead, however, as latencies for data accesses and transfers between separate clusters become bigger than those for within clusters or for smaller monolithic out-of-order microarchitectures.

The extra latencies of inter-cluster communication are typically exposed in overall execution time when a critical data dependence in executing code is scheduled across clusters and, hence, incorporates the inter-cluster communication latency which degrades the performance with respect to a hypothetical (but not necessary feasible) large monolithic out-of-order microarchitecture with similar logical size and/or capacity of hardware structures.

Thus, the efficiency of a clustered out-of-order microarchitecture depends on how well the exposure of the inter-cluster latency is mitigated via steering of allocating instructions to proper clusters, to minimize the rate at which the effective critical path of execution crosses the cluster boundaries—the main cause of performance degradation.

The implementation of optimal instruction steering mechanisms in clustered microarchitectures is widely considered a challenging task. Naïve instruction steering techniques cause large (e.g., 20%-30%) performance degradation with respect to a monolithic out-of-order pipeline baseline of the same issue width, undermining the hardware efficiency of a clustered wide-issue out-of-order processor.

More sophisticated instruction steering heuristics do not only require extra hardware for doing the critical path analysis of fetched code and generating proper steering decisions, but are also very limited in the scope of the analysis, as the steering decision has to be done in the frontend pipeline before the instruction allocation to the out-of-order backend, when the hardware doesn't have sufficient and/or reliable context information about allocating instructions to make the optimal steering decisions. Due to the inherent difficulties, no practically sound clustered implementation of conventional out-of-order pipelines has been developed.

In contrast, in one embodiment of the optimized out-of-order pipeline, the dBT software optimizer analyzes the critical path properties of code at its translation time, as part of regular code scheduling process. The dBT optimizer naturally has sufficient context information and takes into account the criticality of instruction dependencies in the large regions of the code that allows it to make sufficiently optimal steering decisions statically (at code translation time) for the optimized out-of-order pipeline to follow during the code execution.

These dBT-enabled techniques for instruction steering in the optimized, clustered out-of-order pipeline significantly (down to 1%-3%) bridges the efficiency and performance gap between clustered and monolithic out-of-order microarchitecture organizations, which dramatically improves hardware scalability for high-end, very wide out-of-order processor designs, making them feasible from a commercial product perspective.

In one embodiment, the information indicating instruction steering to clusters is delivered to the optimized out-of-order pipeline explicitly, via steering control features defined in the private ISA, which may be implemented as an integral part of the overall ordering restrictions for syllables in a VLIW defined by the ISA. This may be accomplished, for example, using static mapping of particular syllable positions in a VLIW to specific hardware clusters, similarly to how the positions can be mapped to specific execution unit ports in the optimized out-of-order pipeline as described earlier, or via 1-bit cluster steering hint in a syllable encoding for dual-cluster microarchitecture organization (more bits will be needed to encode the steering hints for bigger number of clusters).

(18) Miscellaneous Remarks on the Optimized Out-of-Order Pipeline

The embodiments of the optimized out-of-order pipeline allow efficient implementations of many known, or "classic", dBT optimizations of existing binary codes (e.g., IA). Examples of such optimizations include, but are not limited to, speculative loop invariant code motion, speculative register value spill and fill code optimization (also known as register promotion), speculative control flow optimizations (elimination of biased to only one path conditional and/or indirect branches, IF-conversion, code straightening), etc. In addition, many hardware-only out-of-order pipeline optimizations available in contemporary out-of-order processors can be either implemented "as is", or be simplified and enhanced by implementing them as hardware/software co-designed in the optimized out-of-order pipeline. Examples of such optimizations include, but are not limited to, instruction fusion, move instruction elimination, zero idiom instruction elimination, early physical register reclamation, speculative lock elision, etc.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. An apparatus comprising:
   an instruction fetch unit to fetch Very Long Instruction Words (VLIWs) in program order from memory, each of the VLIWs comprising a plurality of reduced instruction set computing (RISC) instruction syllables grouped into the VLIWs in an order which removes data-flow dependencies and false output dependencies between the syllables, and wherein the plurality of RISC instruction syllables in the VLIWs include one or more false anti-dependencies;
   a decode unit to decode the VLIWs in program order and output the syllables of each decoded VLIW in parallel; and
   an out-of-order execution engine to execute at least some of the syllables in parallel with other syllables, wherein at least some of the syllables are to be executed in a different order than the order in which they are received from the decode unit.

2. The apparatus of claim 1, wherein the out-of-order execution engine includes register renaming logic to map the VLIWs onto physical registers.

3. The apparatus of claim 2, wherein the register renaming logic is to implement a write phase later to a read phase for reading logical register operands to remove the one or more false anti-dependencies.

4. The apparatus of claim 2, wherein the out-of-order execution engine further comprises scheduler setup logic to evaluate dependencies between syllables prior to scheduling of the syllables for execution by functional units, the schedule setup logic to perform in parallel with a read phase of the register renaming logic.

5. The apparatus of claim 4, wherein the scheduler setup logic implements a logic write phase later to a logic read phase to remove the one or more false anti-dependencies.

6. The apparatus as in claim 5, wherein the scheduler setup logic is to further operate on each syllable in parallel with cancellation setup logic usable by the out-of-order execution engine to cancel effects of certain dispatched syllables.

7. The apparatus as in claim 1, further comprising:
   a translator to translate program code from a high-level programming language or a public instruction set architecture (ISA) format to a private ISA format comprising the VLIWs and syllables.

8. The apparatus as in claim 7, wherein the translator comprises an optimizing compiler or binary translator including a dynamic binary translator.

9. The apparatus as in claim 7, wherein the translator resolves data-flow dependencies and false output dependencies when translating to the private ISA format such that the syllables contained within each of VLIWs fetched in-order from memory do not have data-flow dependencies and false output dependencies.

10. The apparatus as in claim 9, wherein the data-flow dependencies comprise read-after-write ("R-A-W") dependencies and the false output dependencies comprise write-after-write ("W-A-W") dependencies.

11. The apparatus as in claim 7, wherein the public ISA comprise the Intel Architecture (IA).

12. The apparatus as in claim 1, wherein the false anti-dependencies comprise write-after-read ("W-A-R") dependencies.

13. The apparatus as in claim 1, wherein the syllables are of multiple types including any combination of one or more control syllables, one or more floating-point vector syllables, one or more memory syllables, and/or one or more integer ALU syllables, where each syllable may be represented by a RISC instruction of a correspondent type.

14. The apparatus as in claim 13, wherein the syllable type is defined the allowed relative position of a syllable in a VLIW.

15. The apparatus as in claim 1, wherein the out-of-order execution engine includes dispatch logic to perform non-speculative early dispatch of syllables.

16. The apparatus as in claim 1, wherein the out-of-order execution engine is fully partitioned, including a register rename/allocation unit having N partitions and a scheduler unit having N partitions.

17. The apparatus as in claim 16, wherein the partitions are physically arranged to handle certain types of instructions.

18. The apparatus as in claim 17, wherein a first partition in the scheduler unit is associated with a first type of execution unit and a second partition in the scheduler unit is associated with a second type of execution unit.

19. The apparatus as in claim 16, wherein the partitioning of the rename/allocation unit and the scheduler unit reduces the number of write ports in the out-of-order execution engine and/or memory ordering buffer, including its load and store buffers.

20. A method comprising:
fetching Very Long Instruction Words (VLIWs) in program order from memory, each of the VLIWs comprising a plurality of reduced instruction set computing (RISC) instruction syllables grouped into the VLIWs in an order which removes data-flow dependencies and false output dependencies between the syllables, and wherein the plurality of RISC instruction syllables in the VLIWs include one or more false anti-dependencies;
decoding the VLIWs in program order and output the syllables of each decoded VLIW in parallel; and
executing at least some of the syllables in parallel with other syllables, wherein at least some of the syllables are to be executed in a different order than the order in which they are received from the decoding.

21. The method as in claim 20, further comprises:
translating program code from a high-level programming language or a public instruction set architecture (ISA) format to a private ISA format comprising the VLIWs and syllables.

22. The method as in claim 21, wherein the public ISA comprise the Intel Architecture (IA).

23. The method as in claim 21, wherein the translating comprises resolving data-flow dependencies and false output dependencies when translating to the private ISA format such that the syllables contained within each of VLIWs fetched in-order from memory do not have data-flow dependencies and false output dependencies.

24. The method as in claim 23, wherein the data-flow dependencies comprise read-after-write ("R-A-W") dependencies and the false output dependencies comprise write-after-write ("W-A-W") dependencies.

25. The method as in claim 20, wherein the false anti-dependencies comprise write-after-read ("W-A-R") dependencies.

26. The method as in claim 20, wherein the syllables are of multiple types including any combination of one or more control syllables, one or more floating-point vector syllables, one or more memory syllables, and/or one or more integer ALU syllables, where each syllable may be represented by a RISC instruction of a correspondent type.

27. The method as in claim 26, wherein the syllable type is defined the allowed relative position of a syllable in a VLIW.

* * * * *